(12) United States Patent
Murata

(10) Patent No.: US 7,730,247 B2
(45) Date of Patent: Jun. 1, 2010

(54) INFORMATION PROCESSING APPARATUS

(75) Inventor: Hiroyuki Murata, Osaka (JP)

(73) Assignee: Panasonic Corporation, Osaka (JP)

( * ) Notice: Subject to any disclaimer, the term of this patent is extended or adjusted under 35 U.S.C. 154(b) by 6 days.

(21) Appl. No.: 12/101,474

(22) Filed: Apr. 11, 2008

(65) Prior Publication Data

US 2008/0320193 A1 Dec. 25, 2008

(51) Int. Cl.
*G06F 13/14* (2006.01)
(52) U.S. Cl. .................. 710/243; 710/116; 710/120; 710/123
(58) Field of Classification Search ......... 710/240–244, 710/316, 120, 52
See application file for complete search history.

(56) References Cited

U.S. PATENT DOCUMENTS

| | | | |
|---|---|---|---|
| 5,832,278 A * | 11/1998 | Pham | 710/243 |
| 6,119,196 A * | 9/2000 | Muller et al. | 710/243 |
| 7,200,699 B2 * | 4/2007 | Bose et al. | 710/120 |
| 7,412,551 B2 * | 8/2008 | Bose et al. | 710/120 |
| 7,512,729 B2 * | 3/2009 | Bose et al. | 710/111 |
| 2002/0023186 A1 | 2/2002 | Kim | |
| 2005/0240707 A1 * | 10/2005 | Hayashi et al. | 710/309 |
| 2006/0271715 A1 * | 11/2006 | Harris et al. | 710/110 |

FOREIGN PATENT DOCUMENTS

JP 2002-278923 A 9/2002

* cited by examiner

*Primary Examiner*—Khanh Dang
(74) *Attorney, Agent, or Firm*—McDermott Will & Emery LLP

(57) ABSTRACT

A bus of a SoC (system on chip) includes a system arbiter for controlling not only a command arbiter but also a read information arbiter, a write data control circuit, a write complete notice arbiter and the like. A sequential table containing a series of system operations including activation processing and application processing and an operation clock information circuit or the like that becomes effective when a SoC bus region is divided by an operation clock frequency are utilized in assignment of priority of buses of the system arbiter. Thus, the information transfer efficiency of the whole system bus and the information transfer efficiency of every transfer originator can be improved.

11 Claims, 23 Drawing Sheets

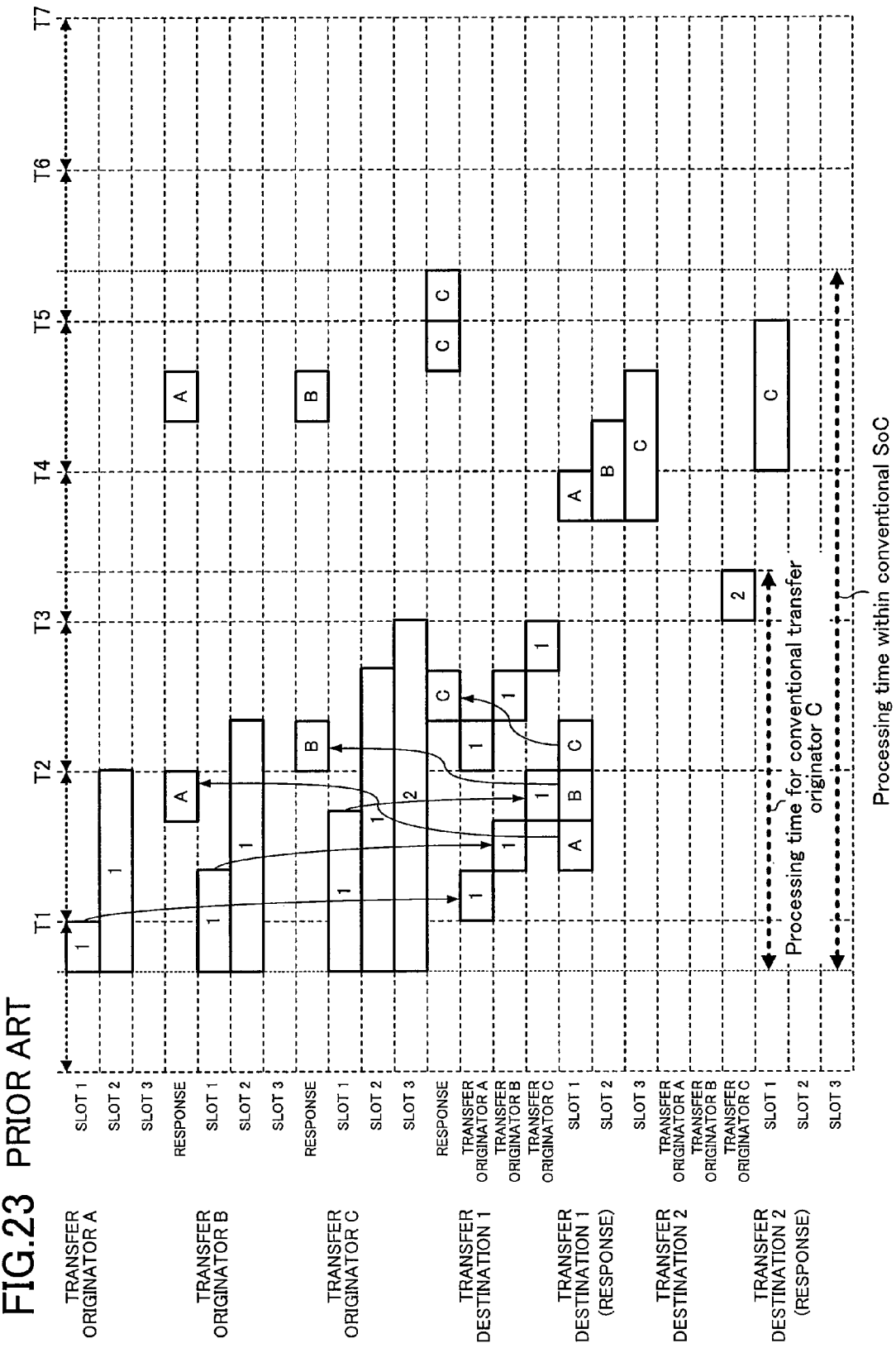

INFORMATION PROCESSING APPARATUS

BACKGROUND OF THE INVENTION

The present invention relates to an information processing apparatus having a contention control function for a SoC (System on Chip) system bus.

FIG. 22 is a block diagram for schematically showing the architecture of a conventional information processing apparatus and FIG. 23 is a timing chart for explaining its operation.

As shown in FIG. 22, the conventional information processing apparatus has a system bus for connecting a plurality of transfer originator bus control units 1 through 3 (transfer originators A, B and C) for respectively sending transfer information and a plurality of transfer destination bus control units 4 and 5 (transfer destinations 1 and 2) for respectively receiving the transfer information to one another, and includes circuits (command buffers) 9 through 11 for storing precedent transfer information of the transfer originator bus control units 1 through 3; buses 6 through 8 for respectively connecting the transfer originator bus control units 1 through 3 to the command buffers 9 through 11; circuits (command arbiters) 13 and 14 for controlling contention of the transfer information between the transfer destination bus control units 4 and 5; a hierarchical bus 12 for connecting the command buffers 9 through 11 to the command arbiters 13 and 14; buses 21 and 22 for respectively connecting the command arbiters 13 and 14 to the transfer destination bus control units 4 and 5; circuits (read information arbiters) 50 through 52 for controlling the contention of read information; buses 37 through 39 for respectively connecting the read information arbiters 50 through 52 to the transfer originator bus control units 1 through 3; a hierarchical bus 40 for connecting the transfer destination bus control units 4 and 5 to the read information arbiters 50 through 52; circuits (decoders) 44 and 45 for identifying read information; and buses 48 and 49 for respectively connecting the decoders 44 and 45 to the transfer destination bus control units 4 and 5.

The operation of the information processing apparatus having the aforementioned architecture will now be described with reference to FIG. 23.

In FIG. 23, the ordinate indicates the states of the transfer originators and the transfer destinations, a transfer originator slot corresponds to a three-stage buffer for storing precedent transfer information, and a transfer destination slot corresponds to a three-stage buffer for storing read data notice information. The abscissa indicates time, and each time duration among times T1, T2, T3, T4, T5, T6 and T7 corresponds to an information processing unit time. Also, the priority for the command arbiters 13 and 14 and the read information arbiters 50 through 52 is in the order of the transfer originator A, the transfer originator B and the transfer originator C.

At the time T1, the transfer originator A issues two transfer information items to the transfer destination 1, the transfer originator B issues two transfer information items to the transfer destination 1 and the transfer originator C issues two transfer information items to the transfer destination 1 and one transfer information item to the transfer destination 2.

In a period between the times T1 and T2, since the transfer originator A has the highest priority according to the priority for the command arbiters 13 and 14, the transfer information items are transferred in the order of the transfer originator A, the transfer originator B and the transfer originator C. Also, the transfer destination 1 issues read information notices to the respective transfer originators.

At the time T2, the transfer originator A issues one transfer information item to the transfer destination 1, the transfer originator B issues one transfer information item to the transfer destination 1, and the transfer originator C issues one transfer information item to the transfer destination 1 and one transfer information item to the transfer destination 2.

In a period between the times T2 and T3, since the transfer originator A has the highest priority in accordance with the priority for the command arbiters 13 and 14, the transfer information items are transferred in the order of the transfer originator A, the transfer originator B and the transfer originator C. Also, the transfer destination 1 issues a read information notice to the transfer originator C.

At the time T3, the transfer originator C alone issues one transfer information item to the transfer destination 2. Also, the transfer destination 1 simultaneously issues a read information notice.

In a period between the times T4 and T6, read information notices issued by the respective transfer destinations are sent to the respective transfer originators in accordance with the priority for the read information arbiters 50 through 52.

In a conventional technique, a bus for supporting split transfer is employed in a bus system in which a plurality of modules are hierarchically connected through buses, but the contention control is performed independently in every bus of the transfer destinations as described above (see Japanese Laid-Open Patent Publication No. 2002-278923).

SUMMARY OF THE INVENTION

In the conventional contention control performed on the basis of the transfer information described above, when the contention control is performed independently in every bus of the transfer destinations, it is disadvantageously impossible to guarantee the performance in consideration of the end of the transfer and to improve the transfer performance of the whole SoC system bus.

In order to overcome the disadvantage, the information processing apparatus according to one aspect of the invention includes a system bus for connecting a plurality of transfer originator bus control units each for sending transfer information and a plurality of transfer destination bus control units each for receiving the transfer information to one another; a circuit provided correspondingly to every bus of the plurality of transfer originator bus control units for storing precedent transfer information; a hierarchical bus for connecting the plurality of transfer originator bus control units to the plurality of transfer destination bus control units; a circuit provided correspondingly to every bus of the plurality of transfer destination bus control units for performing contention control of the transfer information; and a circuit for controlling the circuit provided for performing the contention control.

According to another aspect of the invention, the information processing apparatus includes a system bus for connecting a plurality of transfer originator bus control units each for sending transfer information and a plurality of transfer destination bus control units each for receiving the transfer information to one another; a circuit for performing contention control of write complete notice information, read data information and the transfer information between buses of the plurality of transfer originator bus control units and buses of the plurality of transfer destination bus control units; and a circuit for storing successive transfer information necessary for the contention control.

According to the present invention, the efficiency of successive information transfer between transfer destination bus control units, the transfer efficiency of a whole SoC system bus and the information transfer efficiency of every transfer originator can be improved.

BRIEF DESCRIPTION OF THE DRAWINGS

FIG. 23 is a timing chart of the information processing apparatus of FIG. 22.

DETAILED DESCRIPTION OF THE INVENTION

Information processing apparatuses according to referred embodiments of the invention will now be described with reference to the accompanying drawings.

Embodiment 1

Figure 1:
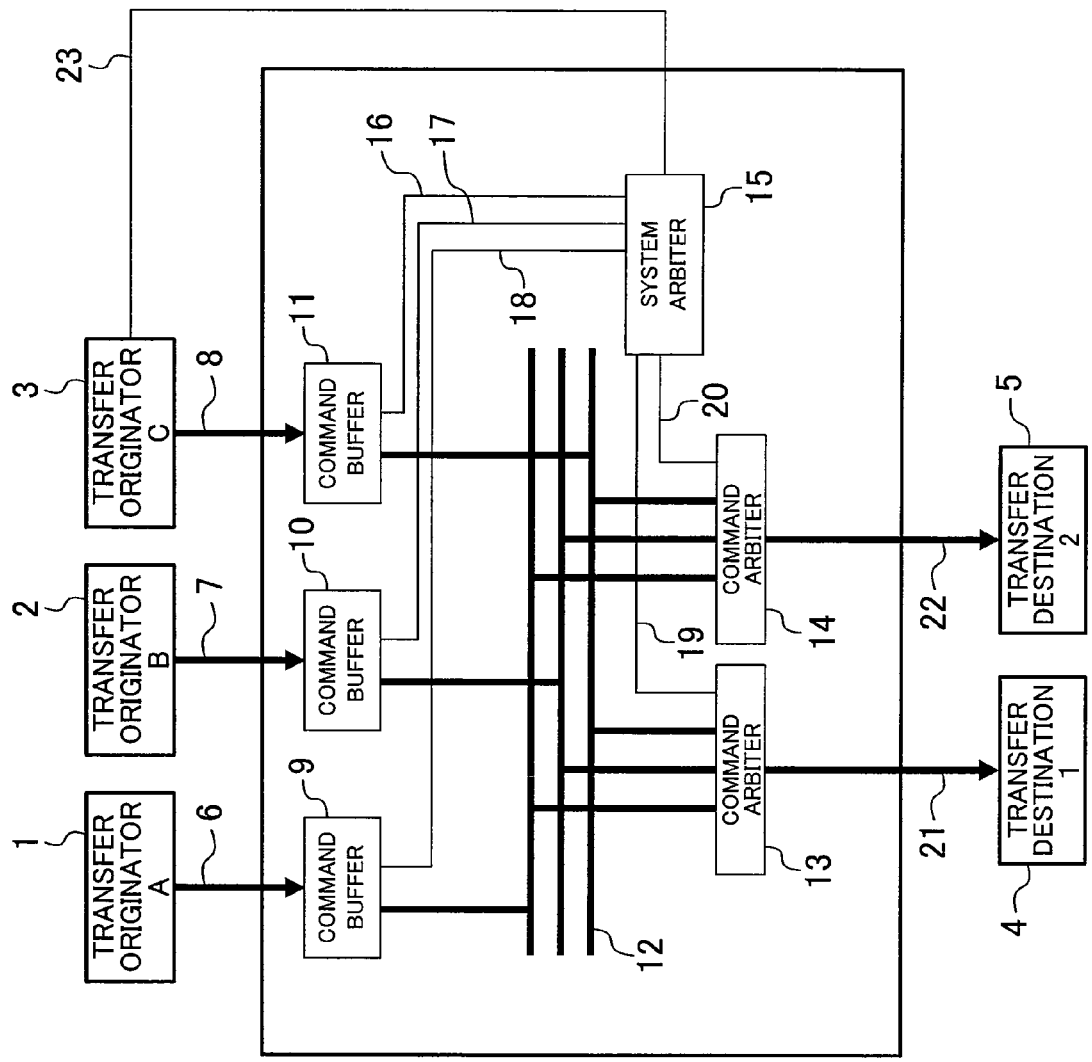
FIG. 1 is a block diagram for schematically showing the architecture of an information processing apparatus according to Embodiment 1 of the invention.

FIG. 1 is a block diagram for schematically showing the architecture of an information processing apparatus according to Embodiment 1 of the invention.

As shown in FIG. 1, the information processing apparatus of this embodiment has a system bus for connecting a plurality of transfer originator bus control units 1 through 3 for respectively sending transfer information and a plurality of transfer destination bus control units 4 and 5 for respectively receiving the transfer information to one another, and includes circuits (command buffers) 9 through 11 for storing precedent transfer information of the transfer originator bus control units 1 through 3; buses 6 through 8 for respectively connecting the transfer originator bus control units 1 through 3 to the command buffers 9 through 11; circuits (command arbiters) 13 and 14 for controlling contention of the transfer information between the transfer destination bus control units 4 and 5; a hierarchical bus 12 for connecting the command buffers 9 through 11 to the command arbiters 13 and 14; a circuit (system arbiter) 15 for controlling the command arbiters 13 and 14; buses 16 through 18 for respectively connecting the command buffers 9 through 11 to the system arbiter 15; buses 19 and 20 for respectively connecting the command arbiters 13 and 14 to the system arbiter 15; buses 21 and 22 for respectively connecting the command arbiters 13 and 14 to the transfer destination bus control units 4 and 5; and a bus 23 for controlling the system arbiter 15 from the transfer originator bus control units 1 through 3.

The operation of the information processing apparatus having the aforementioned architecture will now be described with reference to FIG. 2.

Figure 2:
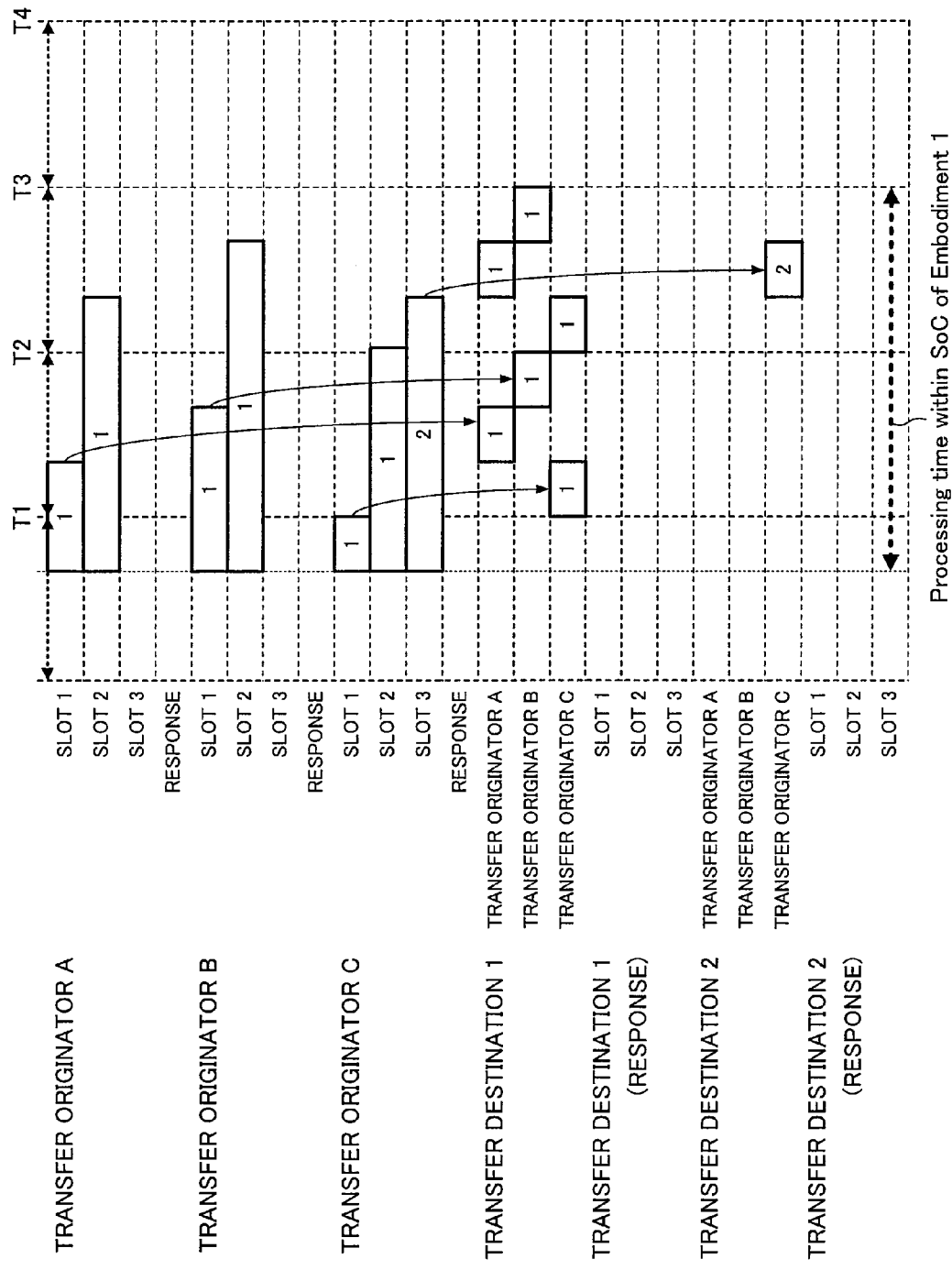
FIG. 2 is a timing chart of the information processing apparatus of FIG. 1.

In FIG. 2, a transfer originator slot corresponds to a three-stage buffer for storing precedent transfer information and a transfer destination slot corresponds to a three-stage buffer for storing precedent write complete notice information and read data notice information. Also, it is assumed that the system arbiter 15 for controlling the command arbiters 13 and 14 from the transfer originators through the bus 23 is set by software for controlling contention on the basis of information of a slot storing precedent transfer information. Furthermore, it is assumed that the priority for the command arbiters 13 and 14 is in the order of the transfer originator A, the transfer originator B and the transfer originator C.

At time T1, the transfer originator A issues two transfer information items to the transfer destination 1, the transfer originator B issues two transfer information items to the transfer destination 1 and the transfer originator C issues two transfer information items to the transfer destination 1 and one transfer information item to the transfer destination 2. The issue information of these transfer originators is transmitted to the system arbiter 15, so that contention control for giving the highest priority to the transfer originator C having the largest number of issues can be transmitted from the system arbiter 15 to the command arbiter 13 of the transfer destination 1.

In a period between the times T1 and T2, since the transfer originator C has the highest priority, the transfer information items are sent in the order of the transfer originator C, the transfer originator A and the transfer originator B.

At the time T2, the transfer originator A issues one transfer information item to the transfer destination 1, the transfer originator B issues one transfer information item to the transfer destination 1 and the transfer originator C issues one transfer information item to the transfer destination 1 and one transfer information item to the transfer destination 2. The issue information of these transfer originators is transmitted to the system arbiter 15, so that contention control for giving the highest priority to the transfer originator C having the largest number of issues can be transmitted from the system arbiter 15 to the command arbiter 13 of the transfer destination 1.

In a period between the times T2 and T3, since the transfer originator C has the highest priority, the transfer information items are sent in the order of the transfer originator C, the transfer originator A and the transfer originator B. When the transfer from the transfer originator C to the transfer destination 1 is completed, the transfer to the transfer destination 2 is started.

At the time T3, the transfer requested by all the transfer originators is completed.

In this manner, the transfer from the transfer originator C to the transfer destination 2 is carried out at early timing, and therefore, the transfer efficiency of the system bus can be improved.

Embodiment 2

Figure 3:
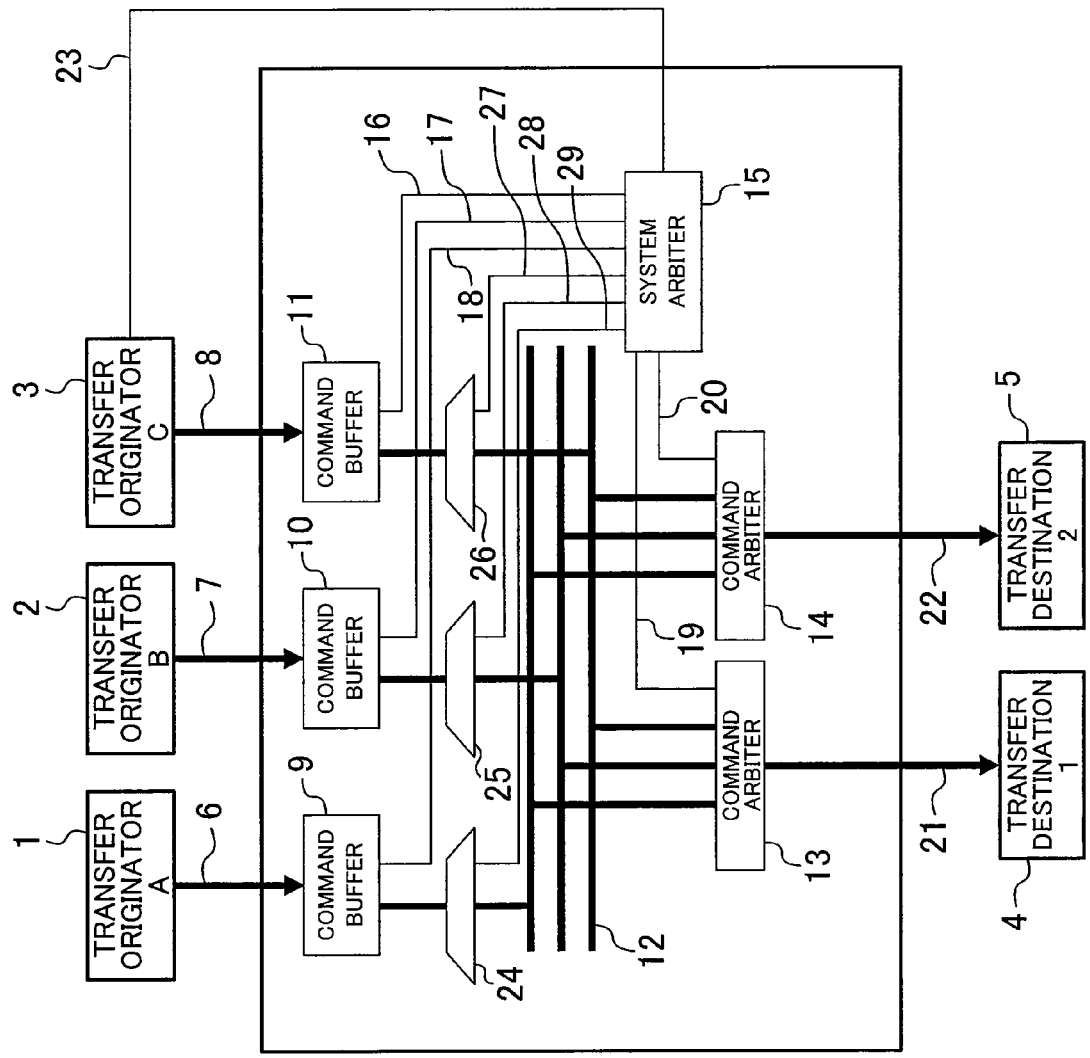
FIG. 3 is a block diagram for schematically showing the architecture of an information processing apparatus according to Embodiment 2 of the invention.

FIG. 3 is a block diagram for schematically showing the architecture of an information processing apparatus according to Embodiment 2 of the invention.

As shown in FIG. 3, the information processing apparatus of this embodiment has a system bus for connecting a plurality of transfer originator bus control units 1 through 3 for respectively sending transfer information and a plurality of transfer destination bus control units 4 and 5 for respectively receiving the transfer information to one another, and includes circuits (command buffers) 9 through 11 for storing precedent transfer information of the transfer originator bus control units 1 through 3; buses 6 through 8 for respectively connecting the transfer originator bus control units 1 through 3 and to command buffers 9 through 11; circuits (command arbiters) 13 and 14 for controlling contention of the transfer information between the transfer destination bus control units 4 and 5; a hierarchical bus 12 for connecting the command buffers 9 through 11 to the command arbiters 13 and 14; a circuit (system arbiter) 15 for controlling the command arbiters 13 and 14; buses 16 through 18 for respectively connecting the command buffers 9 through 11 to the system arbiter 15; buses 19 and 20 for respectively connecting the command arbiters 13 and 14 to the system arbiter 15; buses 21 and 22 for respectively connecting the command arbiters 13 and 14 to the transfer destination bus control units 4 and 5; a bus 23 for controlling the system arbiter 15 from the transfer originator bus control units 1 through 3; address decoders 24 through 26 for respective transfer originator buses; and buses 27 through 29 for respectively connecting the address decoders 24 through 26 to the system arbiter 15.

The operation of the information processing apparatus having the aforementioned architecture will now be described with reference to FIG. 4.

Figure 4:
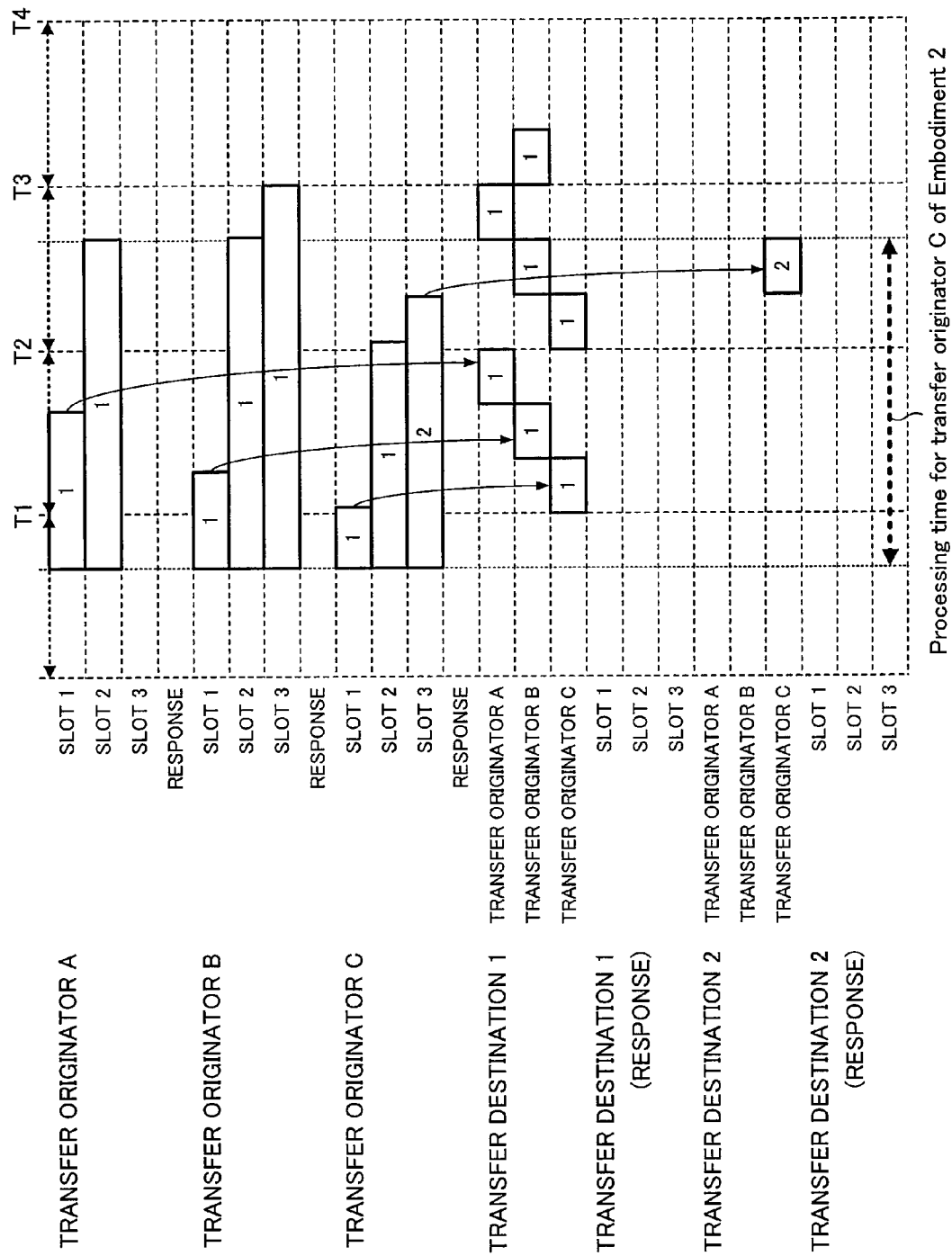
FIG. 4 is a timing chart of the information processing apparatus of FIG. 3.

In FIG. 4, a transfer originator slot corresponds to a three-stage buffer for storing precedent transfer information and a transfer destination slot corresponds to a three-stage buffer for storing precedent write complete notice information and read data notice information. Also, it is assumed that the system arbiter 15 for controlling the command arbiters 13 and 14 from the transfer originator control units 1 through 3 through the bus 23 is set by software for controlling contention on the basis of information of a slot storing precedent transfer information and for using address information of a command within the slot. Furthermore, it is assumed that the priority for the command arbiters 13 and 14 is in the order of the transfer originator A, the transfer originator B and the transfer originator C.

At time T1, the transfer originator A issues two transfer information items to the transfer destination 1, the transfer originator B issues three transfer information items to the transfer destination 1 and the transfer originator C issues two transfer information items to the transfer destination 1 and one transfer information item to the transfer destination 2. The issue information and the address information of these transfer originators are transmitted to the system arbiter 15, so that contention control for giving higher priority to the transfer originator B and the transfer originator C having the largest number of issues and for further giving the highest priority to the transfer originator C determined to have issued the transfer information to the different destinations based on the address information can be transmitted from the system arbiter 15 to the command arbiter 13 of the transfer destination 1.

In a period between the times T1 and T2, since the transfer originator C has the highest priority, the transfer information items are sent in the order of the transfer originator C, the transfer originator B and the transfer originator A.

At the time T2, the transfer originator A issues one transfer information item to the transfer destination 1, the transfer originator B issues two transfer information items to the transfer destination 1 and the transfer originator C issues one transfer information item to the transfer destination 1 and one transfer information item to the transfer destination 2. The issue information of these transfer originators is transmitted to the system arbiter 15, so that contention control for giving the highest priority to the transfer originator C having the largest number of issues to the different transfer destinations can be transmitted from the system arbiter 15 to the command arbiter 13 of the transfer destination 1.

In a period between the times T2 and T3, since the transfer originator C has the highest priority, the transfer information items are sent in the order of the transfer originator C, the transfer originator B and the transfer originator A. When the transfer from the transfer originator C to the transfer destination 1 is completed, the transfer to the transfer destination 2 is started.

Figure 5:
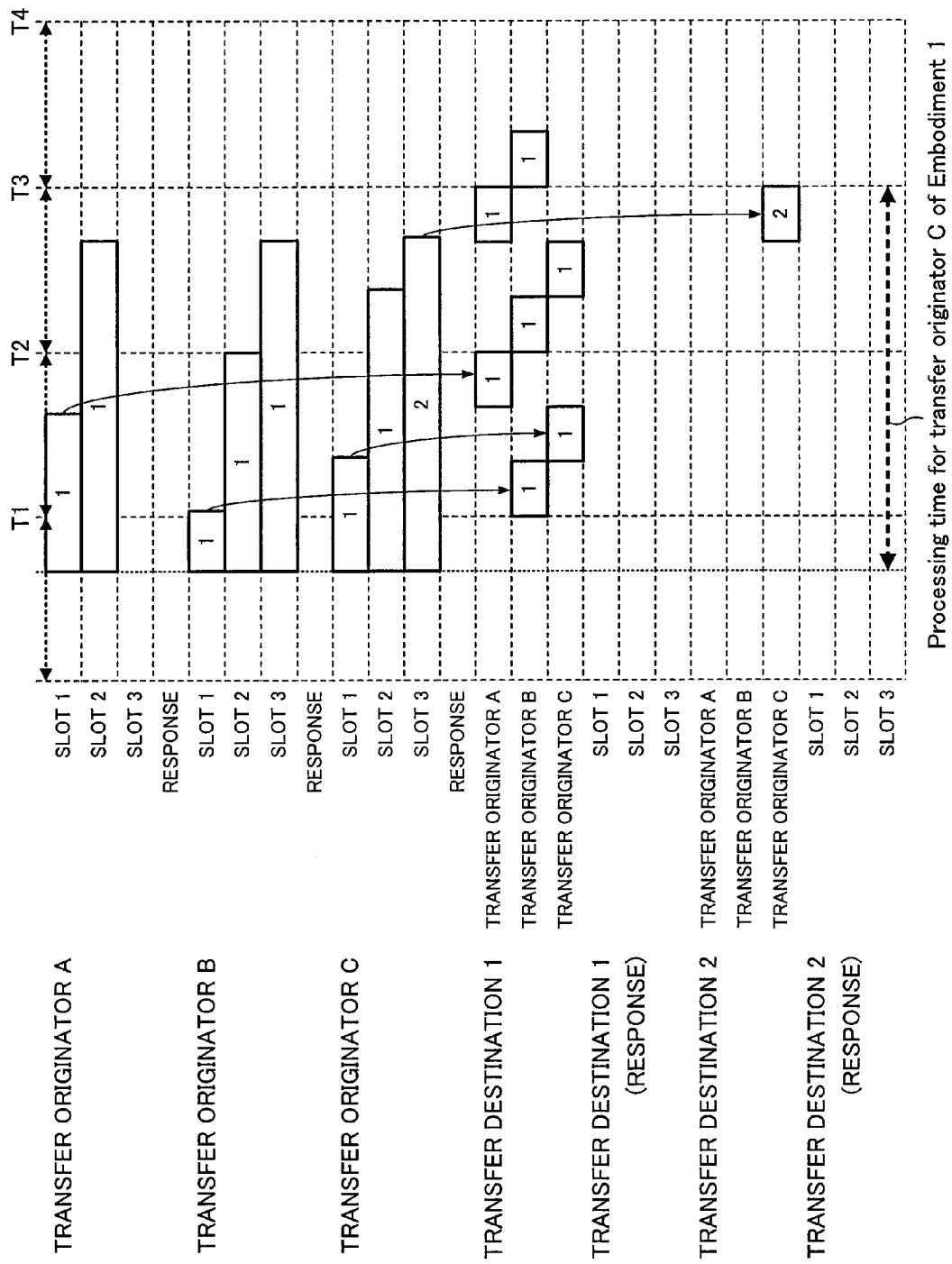
FIG. 5 is a timing chart described as a comparative example of FIG. 4.

FIG. 5 is a timing chart obtained when the same transfer as that shown in FIG. 4 is performed in the information processing apparatus of Embodiment 1 (shown in FIG. 1).

As is understood from comparison between FIGS. 4 and 5, the transfer from the transfer originator C to the transfer destination 2 can be carried out at early timing in Embodiment 2, and therefore, the transfer efficiency of the system bus can be improved while retaining the throughput of the whole system bus.

Embodiment 3

Figure 6:
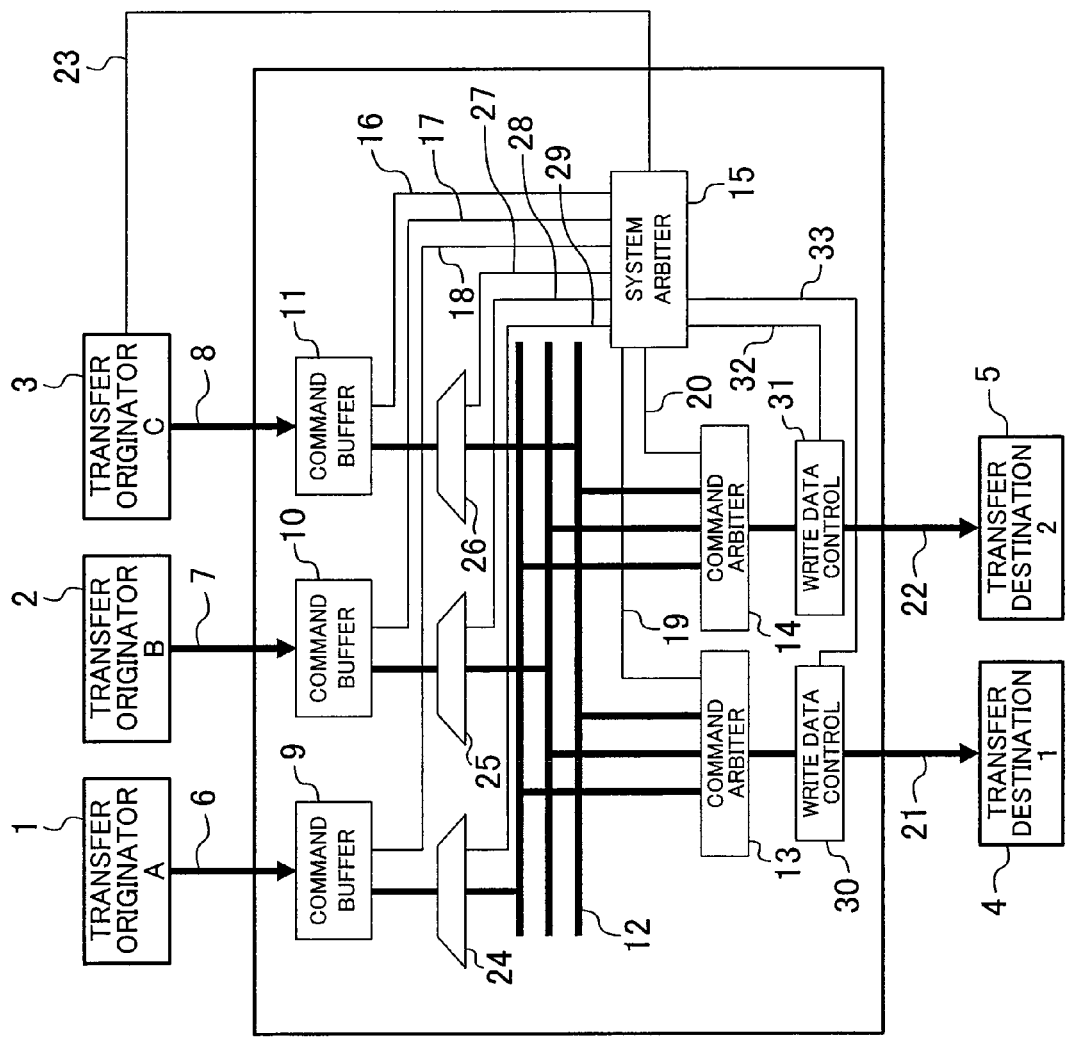
FIG. 6 is a block diagram for schematically showing the architecture of an information processing apparatus according to Embodiment 3 of the invention.

FIG. 6 is a block diagram for schematically showing the architecture of an information processing apparatus according to Embodiment 3 of the invention.

As shown in FIG. 6, the information processing apparatus of this embodiment has a system bus for connecting a plurality of transfer originator bus control units 1 through 3 for respectively sending transfer information and a plurality of transfer destination bus control units 4 and 5 for respectively receiving the transfer information to one another, and includes circuits (command buffers) 9 through 11 for storing precedent transfer information of the transfer originator bus control units 1 through 3; buses 6 through 8 for respectively connecting the transfer originator bus control units 1 through 3 to the command buffers 9 through 11; circuits (command arbiters) 13 and 14 for controlling contention of the transfer information between the transfer destination bus control units 4 and 5; a hierarchical bus 12 for connecting the command buffers 9 through 11 to the command arbiters 13 and 14; a circuit (system arbiter) 15 for controlling the command arbiters 13 and 14; buses 16 through 18 for respectively connecting the command buffers 9 through 11 to the system arbiter 15; buses 19 and 20 for respectively connecting the command arbiters 13 and 14 to the system arbiter 15; buses 21 and 22 for respectively connecting the command arbiters 13 and 14 to the transfer destination bus control units 4 and 5; a bus 23 for controlling the system arbiter 15 from the transfer originator bus control units 1 through 3; address decoders 24 through 26 for respective transfer originator buses; buses 27 through 29 for respectively connecting the address decoders 24 through 26 to the system arbiter 15; write data control circuits 30 and 31 for controlling issue of write data to the respective transfer destinations; and buses 32 and 33 for respectively connecting the write data control circuits 30 and 31 to the system arbiter 15.

The operation of the information processing apparatus having the aforementioned architecture will now be described with reference to FIG. 7.

Figure 7:
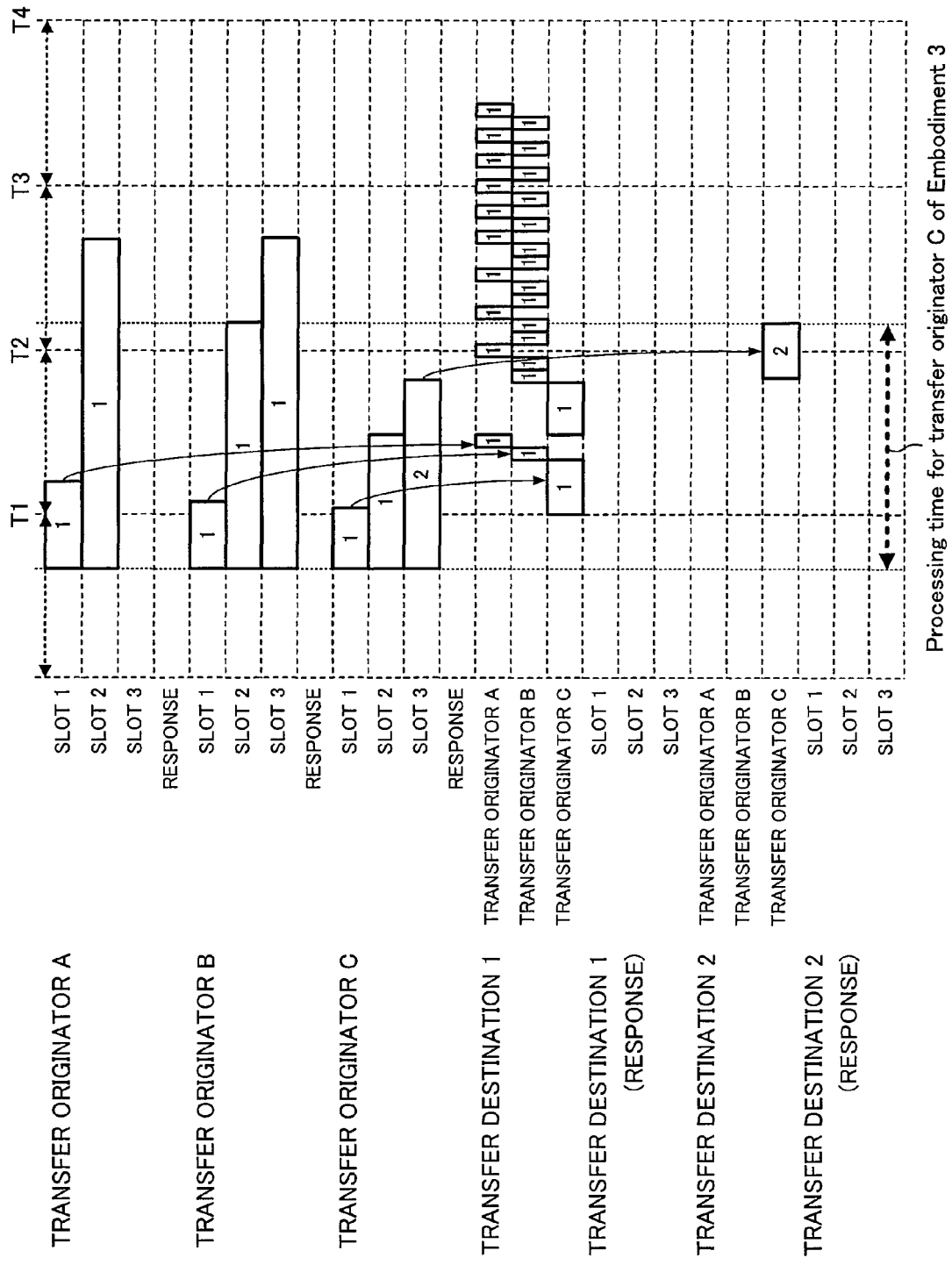
FIG. 7 is a timing chart of the information processing apparatus of FIG. 6.

In FIG. 7, a transfer originator slot corresponds to a three-stage buffer for storing precedent transfer information and a transfer destination slot corresponds to a three-stage buffer for storing precedent write complete notice information and read data notice information. Also, it is assumed that the system arbiter 15 for controlling the command arbiters 13 and 14 from the transfer originator bus control units 1 through 3 through the bus 23 is set by software for controlling contention on the basis of information of a slot storing precedent transfer information and for using address information of a command within the slot. Furthermore, it is assumed that the priority for the command arbiters 13 and 14 is in the order of the transfer originator A, the transfer originator B and the transfer originator C.

At time T1, the transfer originator A issues two transfer information items to the transfer destination 1, the transfer originator B issues three transfer information items to the transfer destination 1 and the transfer originator C issues two transfer information items to the transfer destination 1 and one transfer information item to the transfer destination 2. The issue information and the address information of these transfer originators are transmitted to the system arbiter 15, so that contention control for giving higher priority to the transfer originator B and the transfer originator C having the largest number of issues and for further giving the highest priority to the transfer originator C determined to have issued the transfer information to the different transfer destinations based on the address information can be transmitted from the system arbiter 15 to the command arbiter 13 of the transfer destination 1.

In a period between the times T1 and T2, since the transfer originator C has the highest priority, the transfer information items are sent in the order of the transfer originator C, the transfer originator B and the transfer originator A. The write data control circuit 30 lowers write data traffic of the transfer originators B and A so as to priorly process the write data of the transfer originator C having issued access requests to the different transfer destinations. Also, when the transfer from the transfer originator C to the transfer destination 1 is completed, the transfer to the transfer destination 2 is started.

At the time T2, the transfer originator A issues one transfer information item to the transfer destination 1, the transfer originator B issues two transfer information items to the transfer destination 1 and the transfer originator C has completed to issue transfer information items. The issue information and the address information of these transfer originators are transmitted to the system arbiter 15, so that contention control for giving higher priority to the transfer originator B having the larger number of issues than the transfer originator A can be transmitted from the system arbiter 15 to the command arbiter 13 of the transfer destination 1.

In a period between the times T2 and T3, since the transfer originator C has the highest priority, the transfer information items are sent in the order of the transfer originator C, the transfer originator B and the transfer originator A. Furthermore, when the numbers of access requests made by the transfer originators B and A are the same, the priority is the same, and hence, the transfer information items are transferred with the same write data traffic.

At the time T3, since none of the transfer originators makes an access request, the contention control is not performed.

In a period between the times T3 and T4, the remaining write data transfer of the transfer originators B and A is issued, and the processing is completed.

In this manner, the transfer from the transfer originator C to the transfer destination 2 can be carried out at early timing, and therefore, the transfer efficiency of the system bus can be improved while retaining the throughput of the whole system bus.

Embodiment 4

Figure 8:
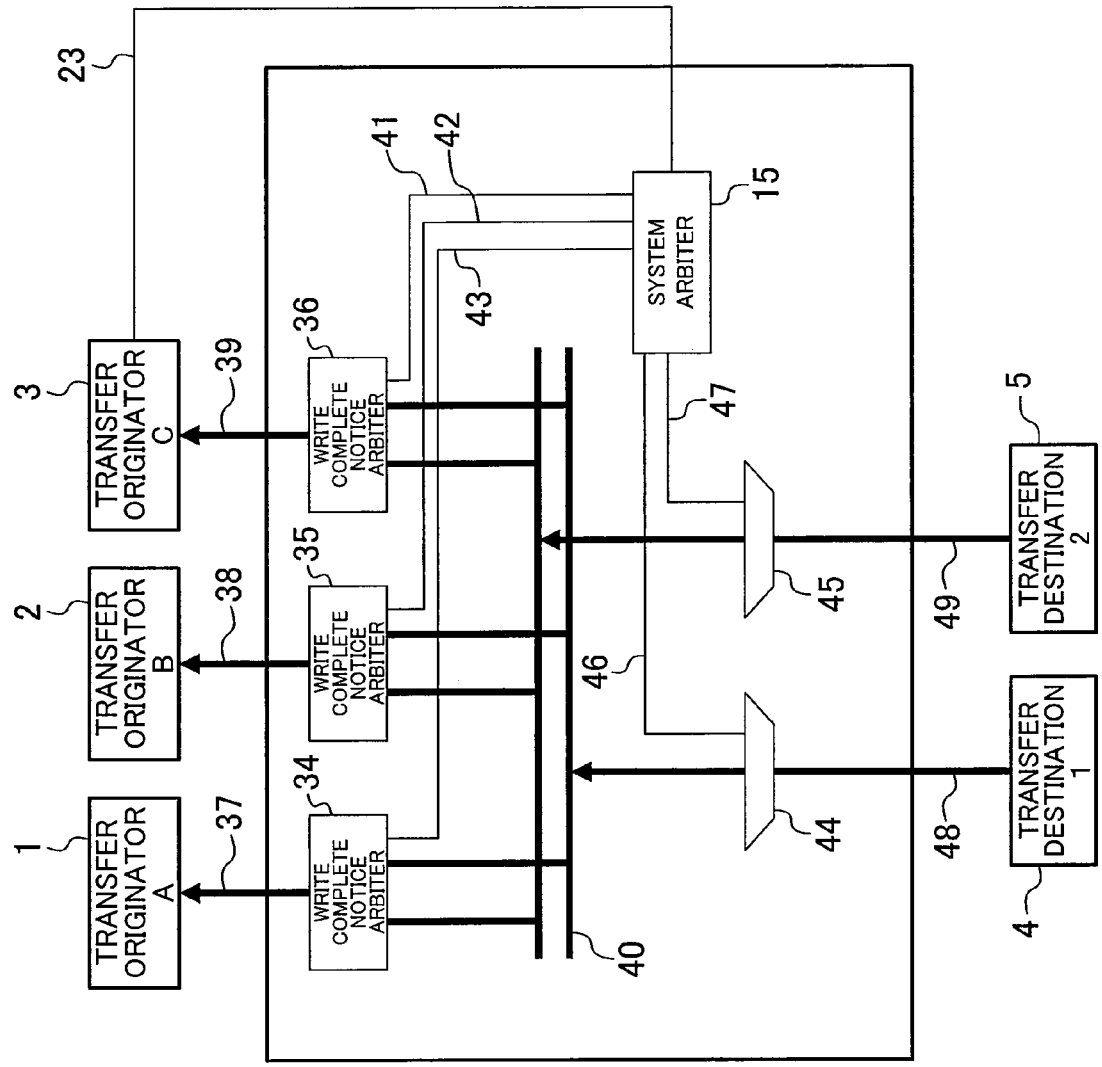
FIG. 8 is a block diagram for schematically showing the architecture of an information processing apparatus according to Embodiment 4 of the invention.

FIG. 8 is a block diagram for schematically showing the architecture of an information processing apparatus according to Embodiment 4 of the invention.

Figure 22:
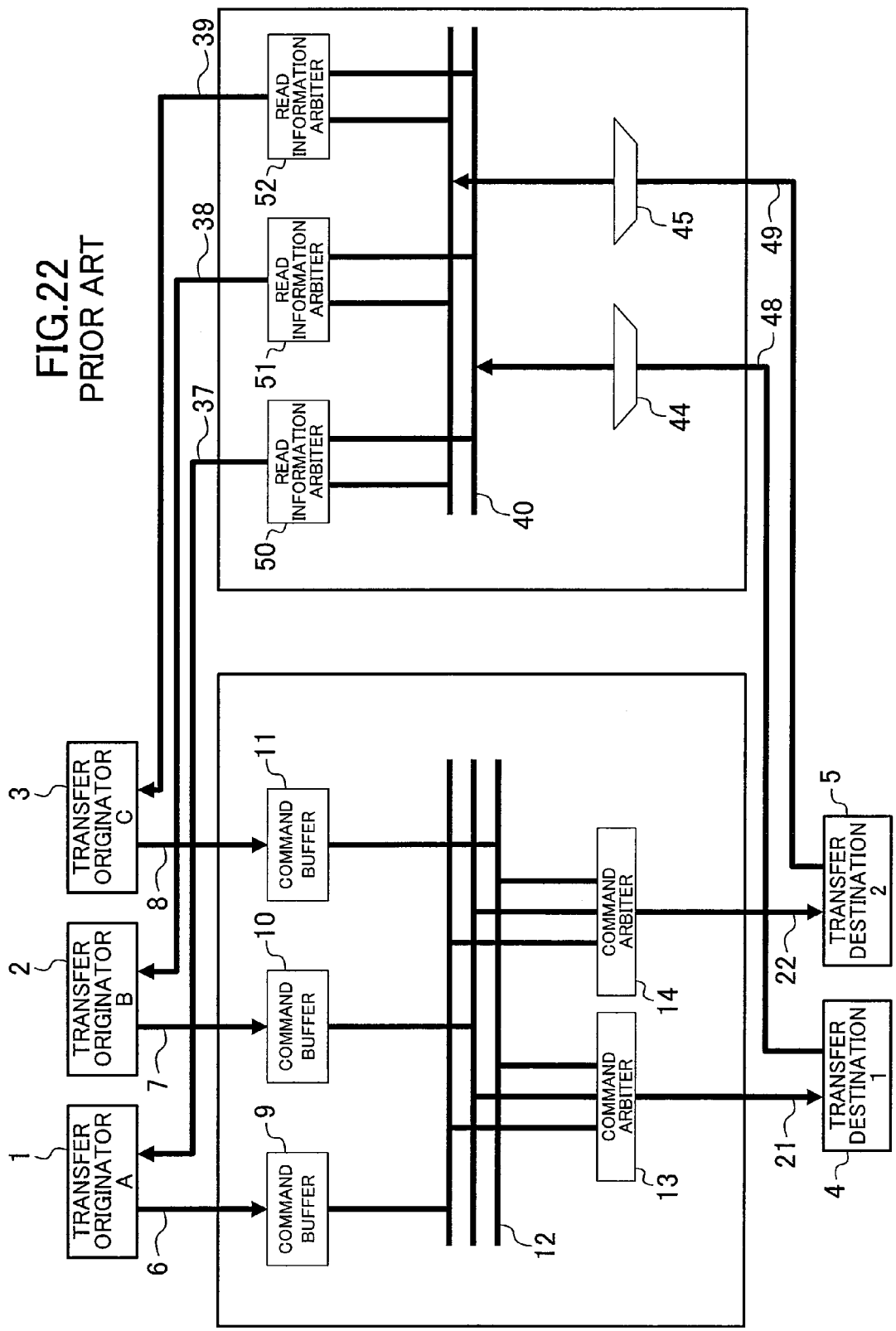
FIG. 22 is a block diagram for schematically showing the architecture of a conventional information processing apparatus.

As shown in FIG. 8, the information processing apparatus of this embodiment has a system bus for connecting a plurality of transfer originator bus control units 1 through 3 for respectively sending transfer information and a plurality of transfer destination bus control units 4 and 5 for respectively receiving the transfer information to one another, and an access from a transfer originator to a transfer destination is processed in the same manner as in the conventional technique (shown in FIG. 22). The information processing apparatus includes, for improving the transfer efficiency by changing a form of sending a notice from a transfer destination to a transfer originator, circuits (write complete notice arbiters) 34 through 36 provided correspondingly to respective buses of the transfer originator bus control units 1 through 3; buses 37 through 39 for respectively connecting the transfer originator bus control units 1 through 3 to the write complete notice arbiters 34 through 36; a hierarchical bus 40 for connecting the write complete notice arbiters 34 through 36 to the transfer destination bus control units 4 and 5; a circuit (system arbiter) 15 for controlling the write complete notice arbiters 34 through 36; buses 41 through 43 for respectively connecting the write complete notice arbiters 34 through 36 to the system arbiter 15; circuits (decoders) 44 and 45 for decoding write transfer complete identification information used in sending a write transfer complete notice to the transfer originator bus control units 1 through 3 from the transfer destination control units 4 and 5; buses 46 and 47 for respectively connecting the decoders 44 and 45 to the system arbiter 15; and buses 48 and 49 for respectively connecting the transfer destination bus control units 4 and 5 to the decoders 44 and 45.

The operation of the information processing apparatus having the aforementioned architecture will now be described with reference to FIG. 9.

Figure 9:
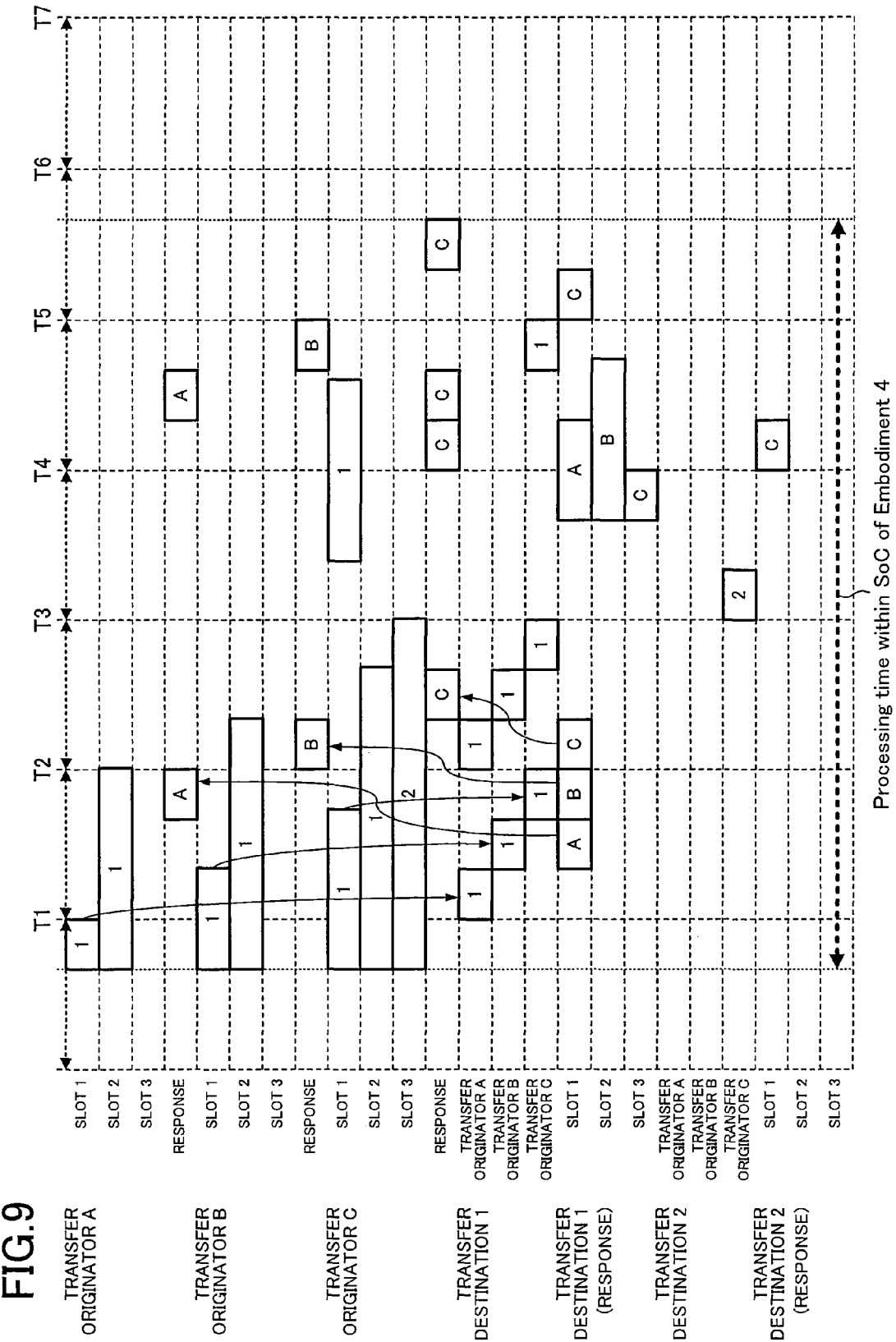
FIG. 9 is a timing chart of the information processing apparatus of FIG. 8.

In FIG. 9, a transfer originator slot corresponds to a three-stage buffer for storing precedent transfer information and a transfer destination slot corresponds to a three-stage buffer for storing precedent write complete notice information and read data notice information. Also, it is assumed that the write complete notice arbiters 34 through 36 are set by software through the bus 23 to be controlled by the system arbiter 15 by using the write transfer complete identification information. Furthermore, it is assumed that the priority for the command arbiters 13 and 14 is in the order of the transfer originator A, the transfer originator B and the transfer originator C.

At time T1, the transfer originator A issues two transfer information items to the transfer destination 1, the transfer originator B issues two transfer information items to the transfer destination 1 and the transfer originator C issues two transfer information items to the transfer destination 1 and one transfer information item to the transfer destination 2. The priority is determined by the command arbiters 13 and 14 with fixed priority through accesses from these transfer originators to the transfer destination 1.

In a period between the times T1 and T2, since the transfer originator A has the highest priority, the transfer information items are sent in the order of the transfer originator A, the transfer originator B and the transfer originator C. Also, write complete notices from the transfer destination 1 are sent to the respective transfer originators.

At the time T2, the transfer originator A issues one transfer information item to the transfer destination 1, the transfer originator B issues one transfer information item to the transfer destination 1 and the transfer originator C issues one transfer information item to the transfer destination 1 and one transfer information item to the transfer destination 2. The priority is determined by the command arbiters 13 and 14 in the same manner as described above.

In a period between the times T2 and T3, since the transfer originator A has the highest priority, the transfer information items are sent in the order of the transfer originator A, the transfer originator B and the transfer originator C. Also, write complete notices from the transfer destination 1 are sent to the respective transfer originators.

At the time T3, although there is an access request from the transfer originator C to the transfer destination 2, there is no contention because other transfer originators issue no access request.

In a period between the times T3 and T4, the access request from the transfer originator C to the transfer destination 2 is executed. Furthermore, although the transfer originator C issues an access request to the transfer destination 1, the access request cannot be processed because a write complete notice has not been received.

At the time T4, write complete notices are issued to all the transfer originators, and since the access request from the transfer originator C to the transfer destination 1 is waited, the system arbiter 15 controls the write complete notice arbiters so as to give the highest priority to the write complete notice to the transfer originator C.

In a period between the times T4 and T5, the write complete notices are executed in the order of the transfer originator C, the transfer originator A and the transfer originator B, and the transfer originator C issues one transfer information item to the transfer destination 1 after receiving the write complete notice from the transfer destination 2.

At the time T5, the access requests from all the transfer originators are completed.

In a period between the times T5 and T6, a write complete notice is sent from the transfer destination 1 to the transfer originator C.

Figure 10:
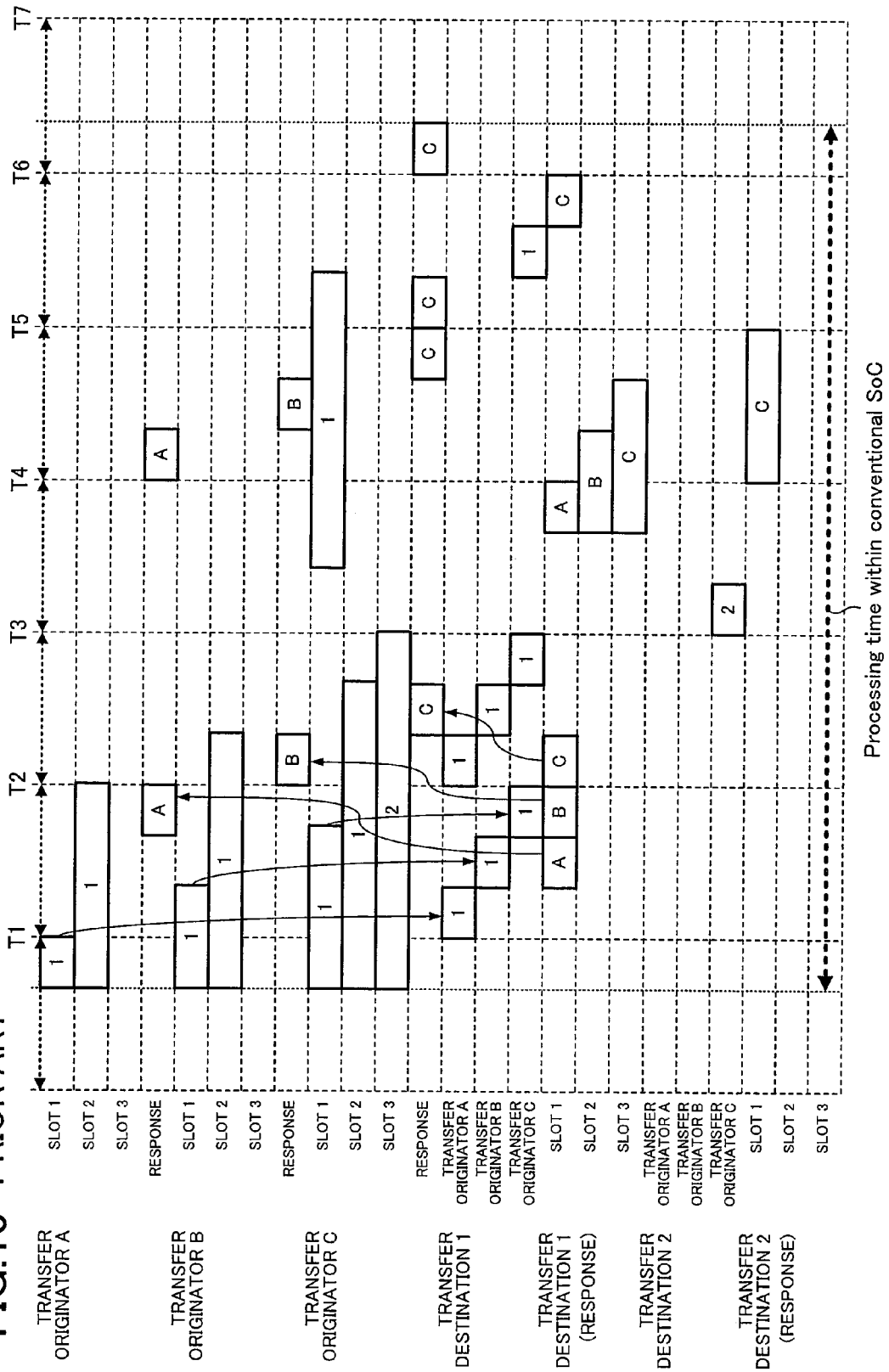
FIG. 10 is a timing chart described as a comparative example of FIG. 9.

FIG. 10 is a timing chart obtained when the same transfer as that shown in FIG. 9 is performed in the conventional information processing apparatus (shown in FIG. 22).

As is understood from comparison between FIGS. 9 and 10, the transfer from the transfer originator C to the transfer destination 2 can be carried out at early timing in Embodiment 4, and therefore, the transfer efficiency of the system bus can be improved while retaining the throughput of the whole system bus.

Embodiment 5

Figure 11:
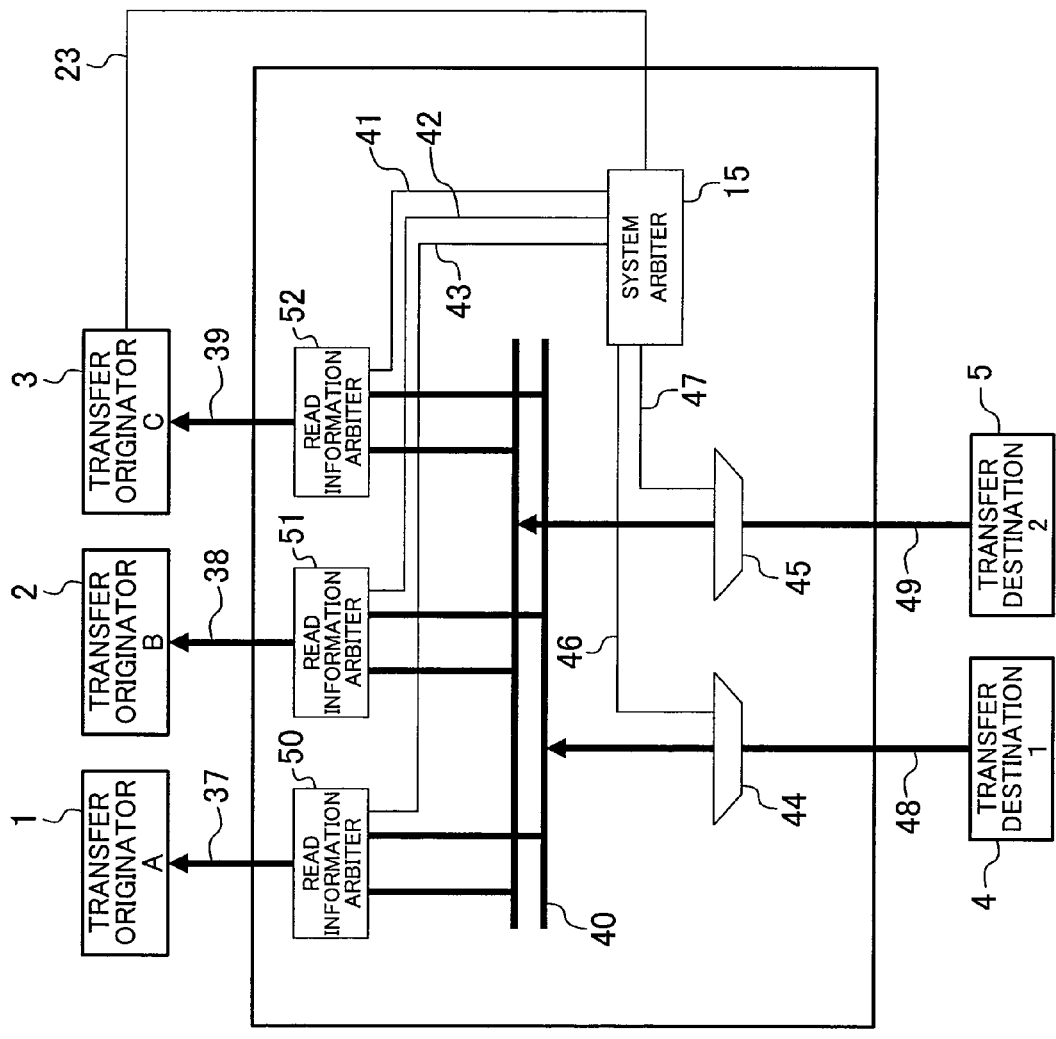
FIG. 11 is a block diagram for schematically showing the architecture of an information processing apparatus according to Embodiment 5 of the invention.

FIG. 11 is a block diagram for schematically showing the architecture of an information processing apparatus of Embodiment 5 obtained by replacing the write complete notice arbiters 34 through 36 of Embodiment 4 (shown in FIG. 8) with read information arbiters 50 through 52. In Embodiment 5, the transfer efficiency of read transfer can be improved in the same manner as in the improvement of the transfer efficiency of write transfer of Embodiment 4.

Embodiment 6

Figure 12:
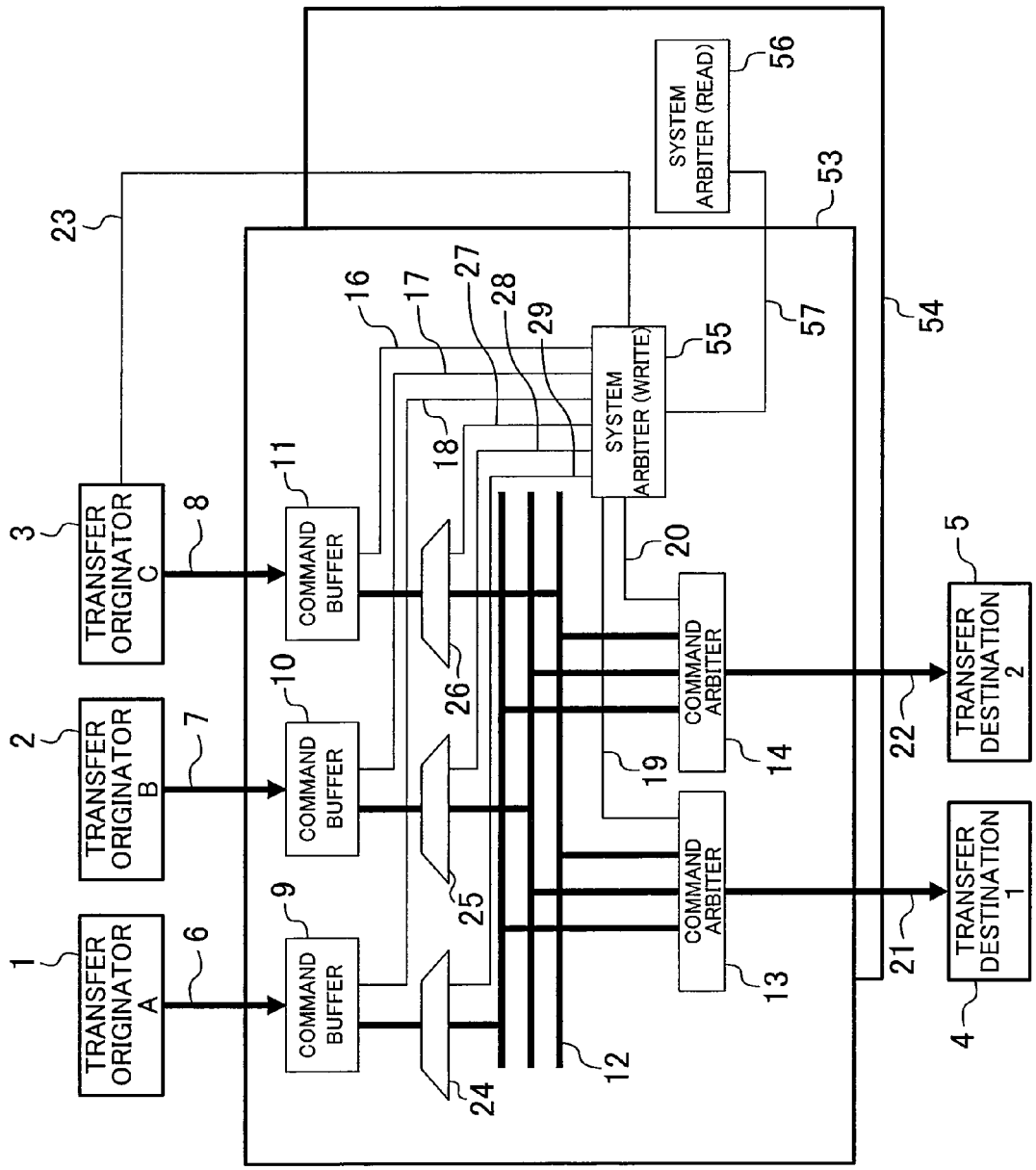
FIG. 12 is a block diagram for schematically showing the architecture of an information processing apparatus according to Embodiment 6 of the invention.

FIG. 12 is a block diagram for schematically showing the architecture of an information processing apparatus according to Embodiment 6 of the invention.

As shown in FIG. 12, the information processing apparatus of this embodiment has a system bus for connecting a plurality of transfer originator bus control units 1 through 3 for respectively sending transfer information and a plurality of transfer destination bus control units 4 and 5 for respectively receiving the transfer information to one another, and includes, in addition to the components of Embodiment 2, a write transferring bus 53, a read transferring bus 54, a write transferring system arbiter 55, a read transferring system arbiter 56, and a bus 57 for connecting the write transferring system arbiter 55 to the read transferring system arbiter 56.

The operation of the information processing apparatus having the aforementioned architecture will now be described with reference to FIG. 13.

Figure 13:
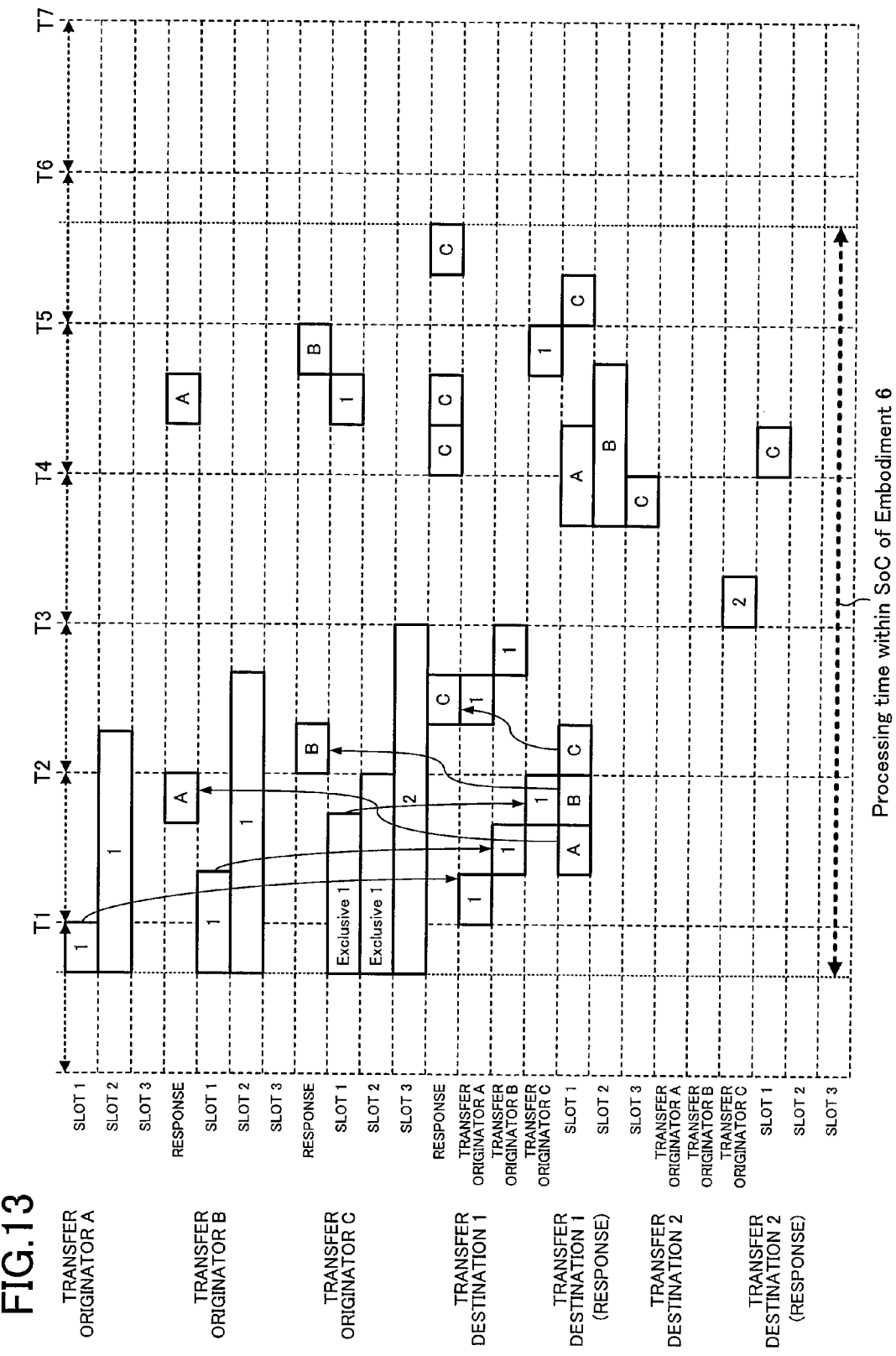
FIG. 13 is a timing chart of the information processing apparatus of FIG. 12.

In FIG. 13, a transfer originator slot corresponds to a three-stage buffer for storing precedent transfer information and a transfer destination slot corresponds to a three-stage buffer for storing precedent write complete notice information and read data notice information. Also, it is assumed that the system arbiter 55 for controlling the command arbiters 13 and 14 from the transfer originators through the bus 23 is set by software for controlling contention on the basis of information of a slot storing precedent transfer information, for using address information of a command within the slot and for using a dependent relationship between write transfer and read transfer. Furthermore, the priority for the command arbiters 13 and 14 is in the order of the transfer originator A, the transfer originator B and the transfer originator C.

At time T1, the transfer originator A issues two transfer information items to the transfer destination 1, the transfer originator B issues two transfer information items to the transfer destination 1 and the transfer originator C issues two exclusive transfer information items to the transfer destination 1 and one transfer information item to the transfer destination 2. A dependent relationship between write transfer and read transfer is detected by the exclusive transfer information items issued by the transfer originator C, and the command arbiters 13 and 14 are controlled so that the processing of the transfer originator C can be successively performed by the write transferring system arbiter 55 and the read transferring system arbiter 56.

In a period between the times T1 and T2, since the transfer originator A has the highest priority, the transfer information items are sent in the order of the transfer originator A, the transfer originator B and the transfer originator C. Also, write complete notices from the transfer destination 1 are sent to the respective transfer originators.

At the time T2, the transfer originator A issues one transfer information item to the transfer destination 1, the transfer originator B issues one transfer information item to the transfer destination 1 and the transfer originator C issues one transfer information item to the transfer destination 1 and one transfer information item to the transfer destination 2. Since the successive processing should be performed because of the detected exclusive transfer information item of the transfer originator C, the priority is assigned by the command arbiters 13 and 14 in the order of the transfer originator C, the transfer originator A and the transfer originator B.

In a period between the times T2 and T3, the transfer is executed in accordance with the priority assigned at the time T2.

At the time T3, although there is an access request from the transfer originator C to the transfer destination 2, there is no contention because none of the other transfer originators issues an access request.

In a period between the times T3 and T4, the access request from the transfer originator C to the transfer destination 2 is executed.

At the time T4, transfer complete notices are issued to all the transfer originators, and since the transfer originator C is waiting for the largest number of transfer complete notices, the system arbiters 55 and 56 control the transfer complete notice arbiters so as to send the transfer complete notice to the transfer originator C the most priorly.

In a period between the times T4 and T5, the transfer complete notices are sent in the order of the transfer originator C, the transfer originator A and the transfer originator B, and the transfer originator C issues one transfer information item to the transfer destination 1 after receiving the transfer complete notice from the transfer destination 2.

At the time T5, the access requests of all the transfer originators have been completed.

In a period between the times T5 and T6, a transfer complete notice from the transfer destination 1 is sent to the transfer originator C.

Figure 14:
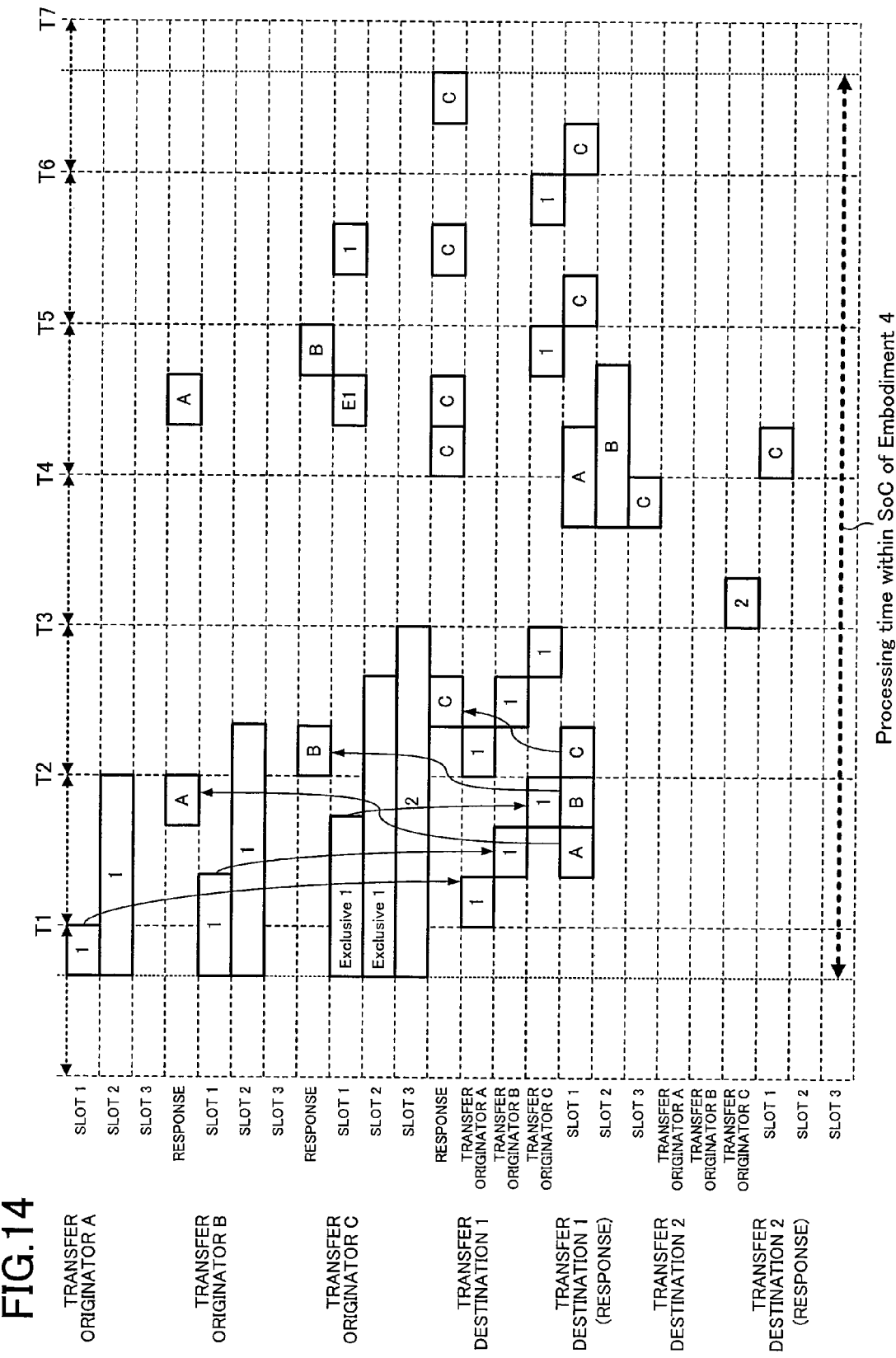
FIG. 14 is a timing chart described as a comparative example of FIG. 13.

FIG. 14 is a timing chart obtained when the same transfer as that shown in FIG. 13 is performed in the information processing apparatus of Embodiment 4 (shown in FIG. 8).

As is understood from comparison between FIGS. 13 and 14, the exclusive transfer issued by the transfer originator C can be carried out without retrying in Embodiment 6, and therefore, the transfer efficiency of the system bus can be improved.

Embodiment 7

Figure 15:
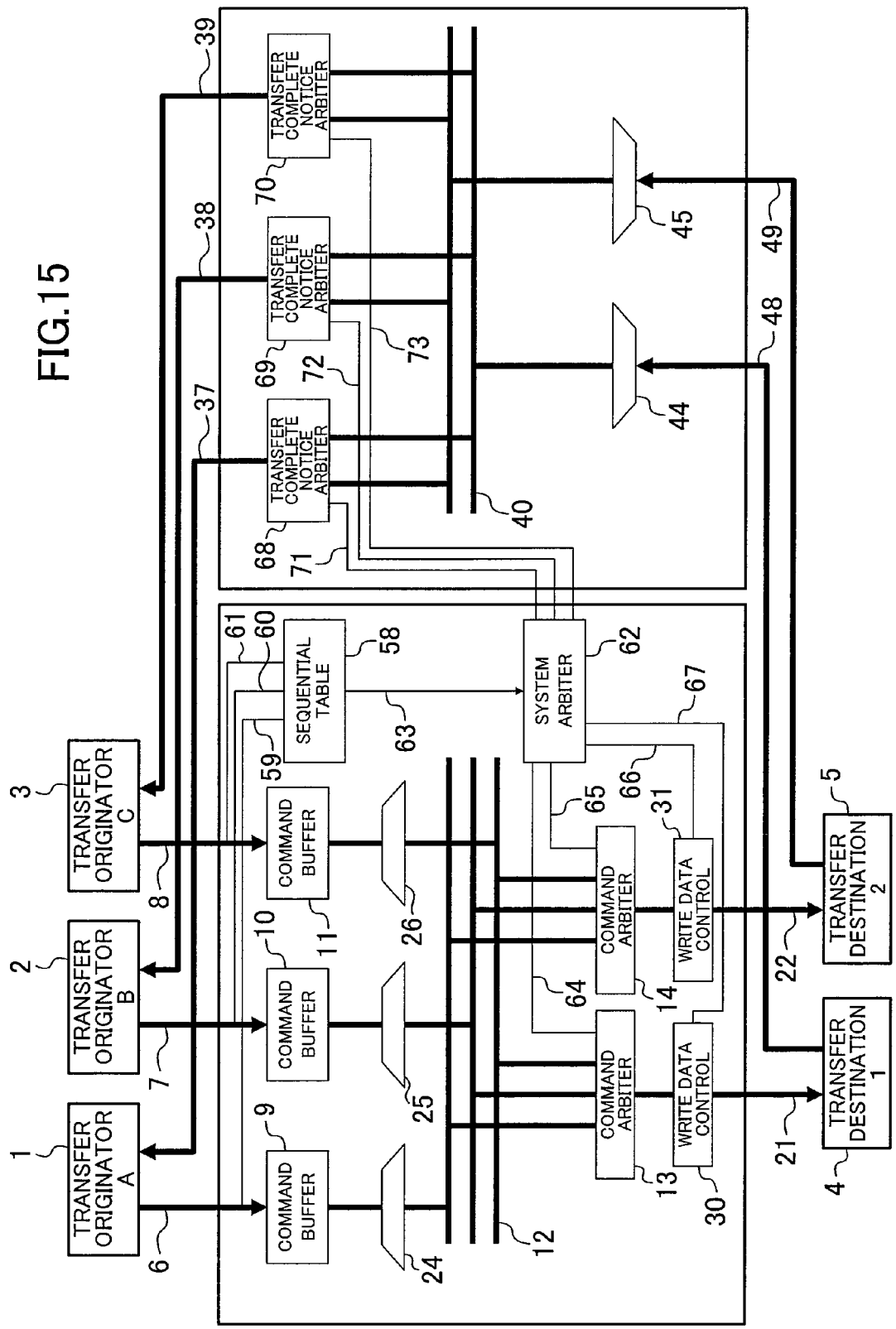
FIG. 15 is a block diagram for schematically showing the architecture of an information processing apparatus according to Embodiment 7 of the invention.

FIG. 15 is a block diagram for schematically showing the architecture of an information processing apparatus according to Embodiment 7 of the invention.

As shown in FIG. 15, the information processing apparatus of this embodiment has a system bus for connecting a plurality of transfer originator bus control units 1 through 3 for respectively sending transfer information and a plurality of transfer destination bus control units 4 and 5 for respectively receiving the transfer information to one another, and includes, in addition to the components of Embodiments 4 and 5, a circuit (sequential table) 58 for storing successive transfer information necessary for the contention control; buses 59 through 61 used for selecting and rewriting the sequential table 58 from the transfer originator bus control units 1 through 3; a system arbiter 62 for controlling all arbiters included in the SoC; a bus 63 for connecting the sequential table 58 to the system arbiter 62; buses 64 and 65 for respectively connecting the command arbiters 13 and 14 to the system arbiter 62; buses 66 and 67 for respectively connecting the write data control circuits 30 and 31 to the system arbiter 62; transfer complete notice arbiters 68 through 70 related to write complete notice and read information; and buses 71 through 73 for respectively connecting the transfer complete notice arbiters 68 through 70 to the system arbiter 62.

The operation of the information processing apparatus having the aforementioned architecture will now be described with reference to FIG. 16.

Figure 16:
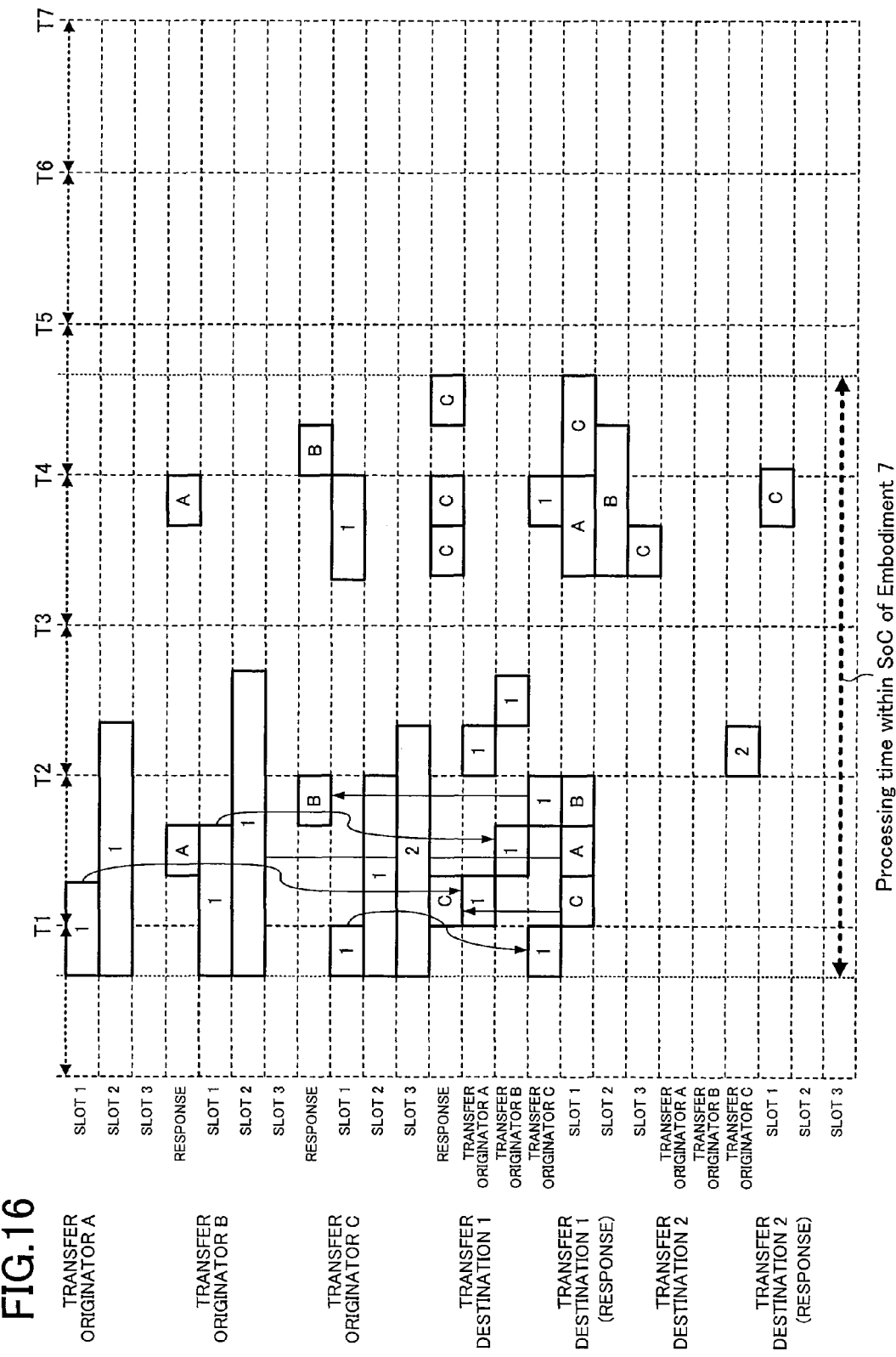
FIG. 16 is a timing chart of the information processing apparatus of FIG. 15.

In FIG. 16, a transfer originator slot corresponds to a three-stage buffer for storing precedent transfer information and a transfer destination slot corresponds to a three-stage buffer for storing precedent write complete notice information and read data notice information. Also, it is assumed that successive transfer information for executing transfer from a transfer originator is written in the sequential table 58, that information of the sequential table 58 selected by a transfer originator is transmitted to the system arbiter 62 and that the command arbiters 13 and 14, the write data control circuits 30 and 31 and the transfer complete notice arbiters 68 through 70 are controlled by the system arbiter 62.

At time T1, the transfer originator A issues two transfer information items to the transfer destination 1, the transfer originator B issues two transfer information items to the transfer destination 1 and the transfer originator C issues two exclusive transfer information items to the transfer destination 1 and one transfer information item to the transfer destination 2. Since the system arbiter 62 gives the highest priority to the transfer originator C in accordance with the sequential table 58, one of the two transfer information items of the transfer originator C is sent to the transfer destination 1 with no contention latency.

In a period between the times T1 and T2, the system arbiter 62 executes the transfer in the order of the transfer originator A, the transfer originator B and the transfer originator C in accordance with the sequential table 58, and transfer complete notices are also sent in accordance with the sequential table 58 with no contention latency.

Also in a period between the times T2 and T5, the command arbiters 13 and 14, the write data control circuits 30 and 31 and the transfer complete notice arbiters 68 through 70 are controlled in a similar manner in accordance with the sequential table 58 selected by each transfer originator, so that the transfer can be controlled without grasping the states of the buses included in the SoC.

As is understood from comparison between FIGS. 16 and 9, the transfer between a transfer originator and a transfer destination can be executed with no contention latency in Embodiment 7, and therefore, the transfer efficiency of the system bus can be improved.

Embodiment 8

Figure 17:
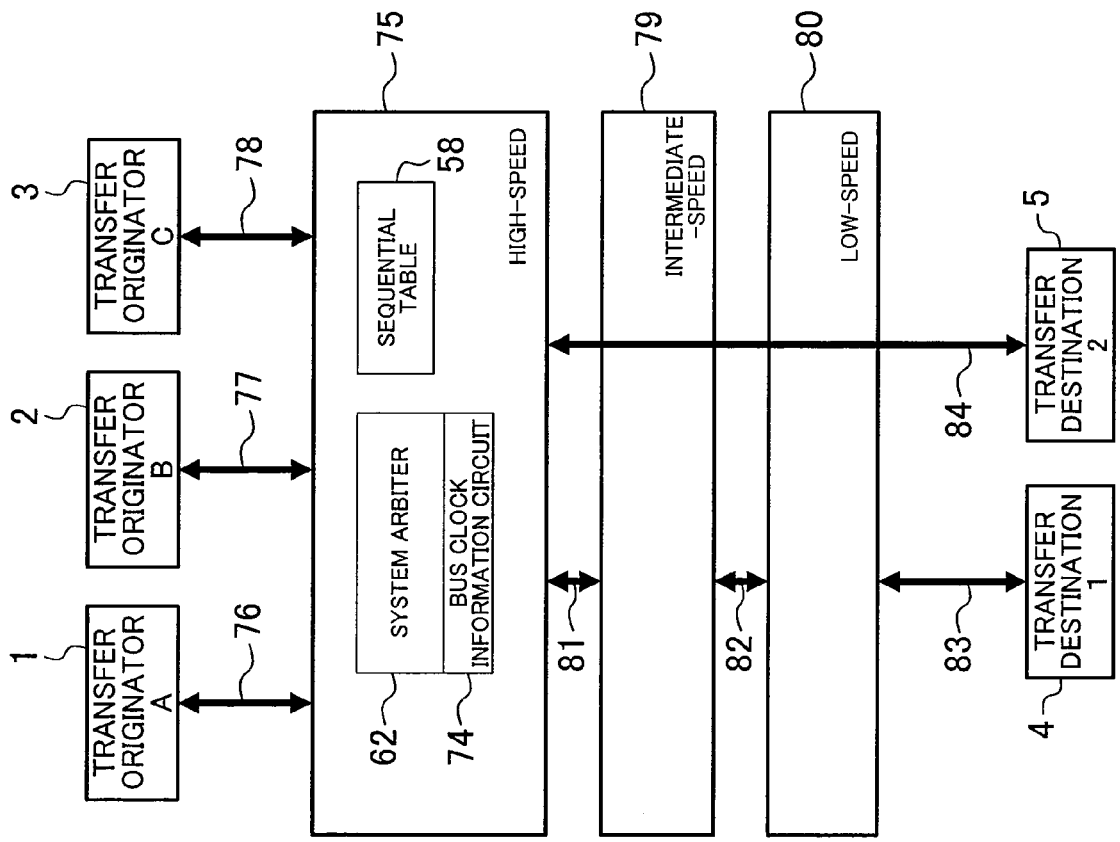
FIG. 17 is a block diagram for schematically showing the architecture of an information processing apparatus according to Embodiment 8 of the invention.

FIG. 17 is a block diagram for schematically showing the architecture of an information processing apparatus according to Embodiment 8 of the invention.

As shown in FIG. 17, the information processing apparatus of this embodiment has a system bus for connecting a plurality of transfer originator bus control units 1 through 3 for respectively sending transfer information and a plurality of transfer destination bus control units 4 and 5 for respectively receiving the transfer information to one another, and includes, in addition to the components of Embodiment 7, a bus clock information circuit 74; a high-speed bus region 75 operated with a high-speed clock; buses 76 through 78 for respectively connecting the transport originator bus control units 1 through 3 to the high-speed bus region 75; an intermediate-speed bus region 79 operated with an intermediate-speed clock; a low-speed bus region 80 operated with a low-speed clock; a bus 81 for connecting the high-speed bus region 75 to the intermediate-speed bus region 79; a bus 82 for connecting the intermediate-speed bus region 79 to the low-speed bus region 80; a bus 83 for connecting the low-speed bus region 80 to the transfer destination bus control unit 4 (the transfer destination 1); and a bus 84 for connecting the high-speed bus region 75 to the transfer destination bus control unit 5 (the transfer destination 2).

The operation of the information processing apparatus having the aforementioned architecture will now be described with reference to FIG. 18.

Figure 18:
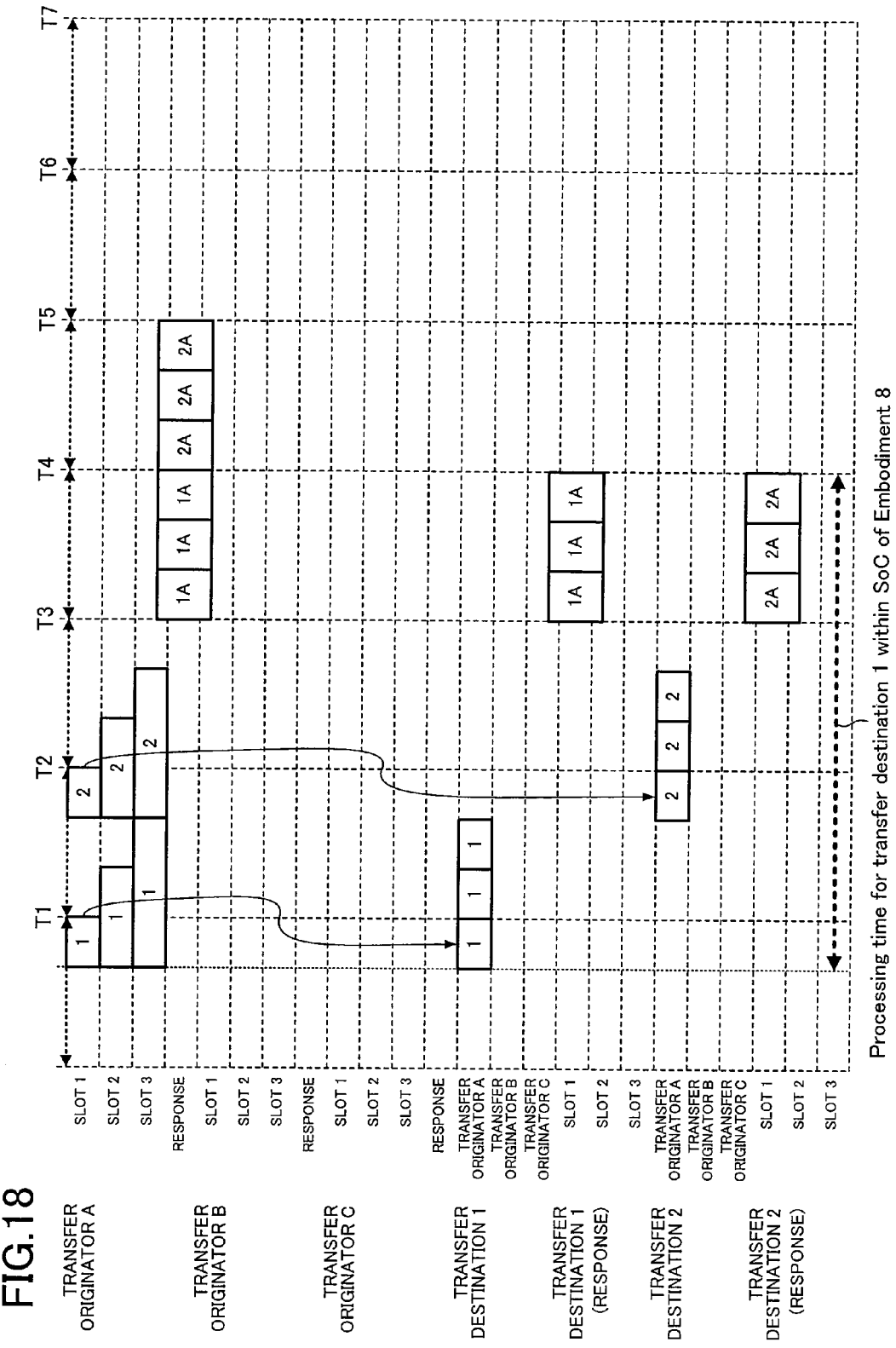
FIG. 18 is a timing chart of the information processing apparatus of FIG. 17.

In FIG. 18, a transfer originator slot corresponds to a three-stage buffer for storing precedent transfer information and a transfer destination slot corresponds to a three-stage buffer for storing precedent write complete notice information and read data notice information. Also, it is assumed that successive transfer information for executing transfer from a transfer originator is written in the sequential table 58, that information of the sequential table 58 selected by a transfer originator is transmitted to the system arbiter 62 and that the command arbiters 13 and 14, the write data control circuits 30 and 31 and the transfer complete notice arbiters 68 through 70 are controlled by the system arbiter 62. Furthermore, it is assumed that the system arbiter 62 includes the bus clock information circuit 74 so as to use bus clock information for the contention control.

In a period between times T1 and T3, the transfer originator A issues three transfer information items to the transfer destination 1 and three transfer information items to the transfer destination 2. The system arbiter 62 sends transfer information of the transfer originator A to the transfer destinations 1 and 2 in accordance with the sequential table 58.

In a period between times T3 and T5, in the case where a plurality of transfer complete notices from the transfer destinations 1 and 2 are simultaneously issued, the priority for the transfer complete notices simultaneously issued is assigned on the basis of precedent issue transfer information and bus clock information by using information of a transfer destination to swiftly return a transfer complete notice and a transfer destination to slowly return a transfer complete notice. Accordingly, the transfer complete notice is priorly sent from the transfer destination 1 to slowly return the transfer complete notice.

Figure 19:
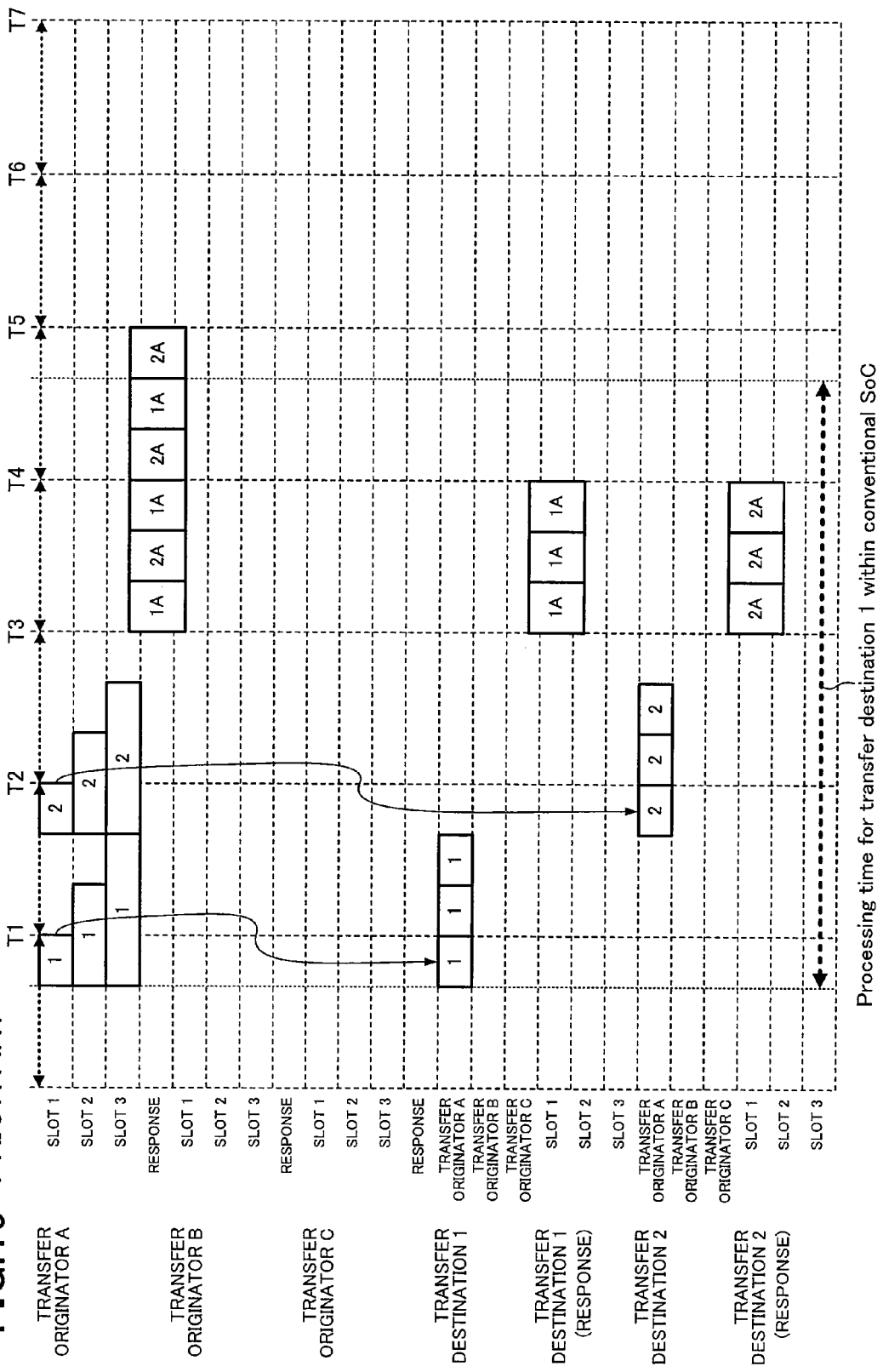
FIG. 19 is a timing chart described as a comparative example of FIG. 18.

FIG. 19 is a timing chart obtained when the same transfer as that shown in FIG. 18 is performed in the conventional information processing apparatus (shown in FIG. 22).

As is understood from comparison between the FIGS. 18 and 19, the priority is given to a transfer destination to slowly issue a transfer complete notice in Embodiment 8, and hence, the throughput of each transfer originator can be improved.

Embodiment 9

Figure 20:
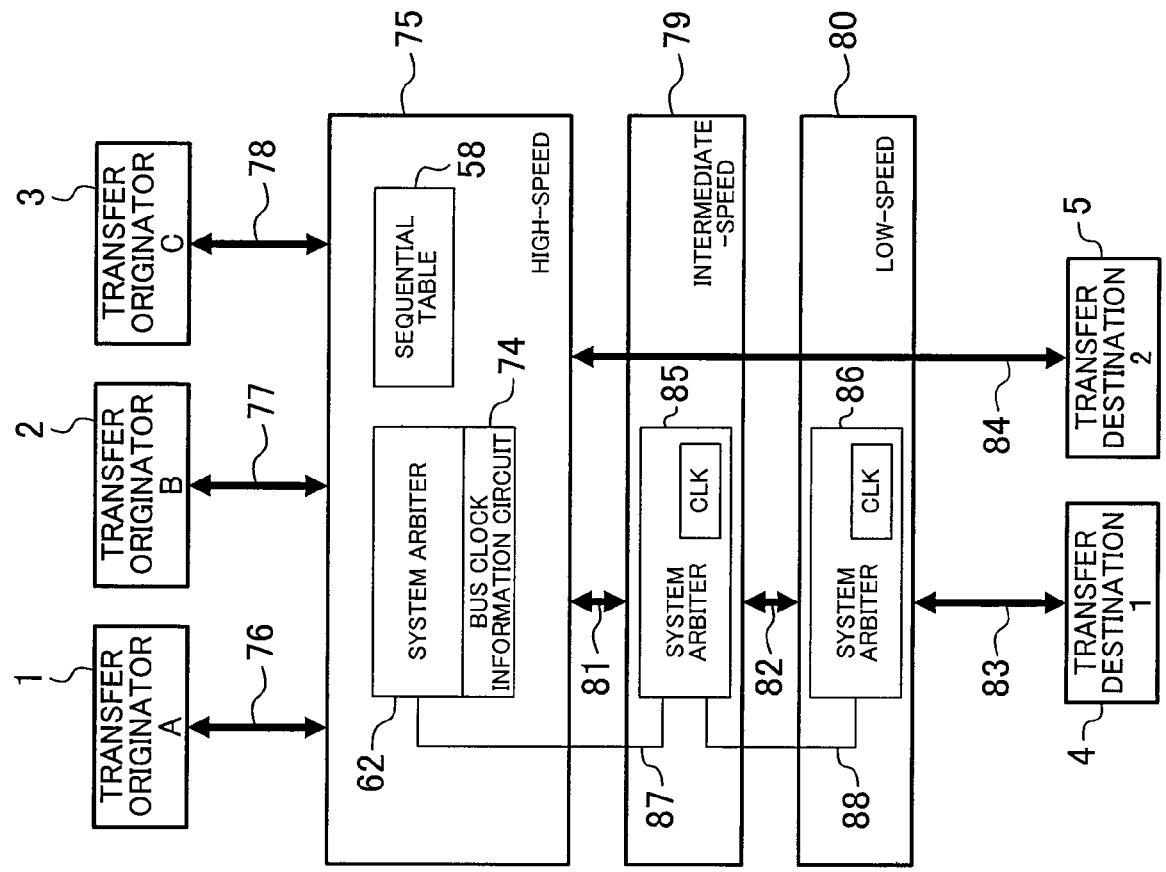
FIG. 20 is a block diagram for schematically showing the architecture of an information processing apparatus according to Embodiment 9 of the invention.

FIG. 20 shows an information processing apparatus of this embodiment obtained by additionally providing, in the information processing apparatus of Embodiment 8, system arbiters 85 and 86 each including a bus clock information circuit the same as that included in the high-speed bus region 75 respectively in the intermediate-speed bus region 79 and the low-speed bus region 80, and providing buses 87 and 88 for connecting the system arbiters 62, 85 and 86 of the respective bus regions to each other.

According to this embodiment, the same effect as that of Embodiment 8 can be attained, and in addition, the transfer efficiency can be improved with all the high-speed bus region 75, the intermediate-speed bus region 79 and the low-speed bus region 80.

Embodiment 10

Figure 21:
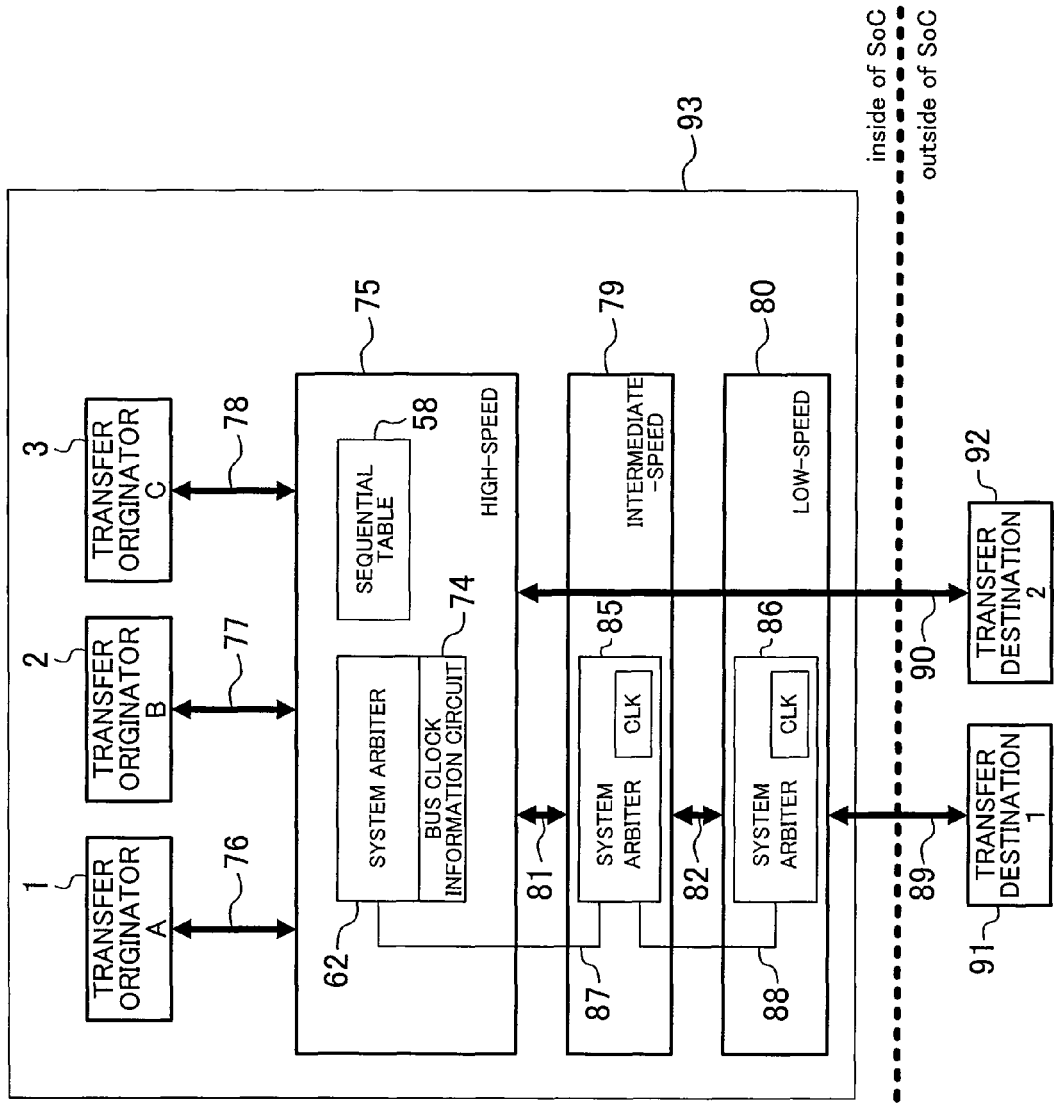
FIG. 21 is a block diagram for schematically showing the architecture of an information processing apparatus according to Embodiment 10 of the invention.

FIG. 21 shows an information processing apparatus of this embodiment obtained by additionally providing, in the information processing apparatus of Embodiment 9, a transfer destination 91 corresponding to an external memory, a transfer destination 92 corresponding to an external communication processing unit and buses 89 and 90 for respectively connecting the whole system 93 of Embodiment 9 to the transfer destinations 91 and 92.

According to this embodiment, the same effect as that of Embodiment 9 can be attained, and the transfer efficiency of the SoC system bus including accesses to the outside of the SoC can be improved.

As described so far, the information processing apparatus of this invention includes a system arbiter used for batch management of the contention control of a SoC bus, and therefore, the invention is useful for improving the transfer efficiency of the whole SoC bus and the transfer efficiency of every transfer originator.

What is claimed is:

1. An information processing apparatus for connecting a plurality of transfer originator bus control units, each of which is configured to send transfer information, and a plurality of transfer destination bus control units, each of which is configured to receive the transfer information, the apparatus comprising:

a plurality of command buffers, each of which is connected to a corresponding one of the plurality of transfer originator bus control units, and is configured to store precedent transfer information;

a hierarchical bus for connecting the plurality of transfer originator bus control units to the plurality of transfer destination bus control units;

a plurality of command arbiters, each of which is connected to a corresponding one of the plurality of transfer destination bus control units, and is configured to perform contention control of the transfer information;

a system arbiter connected to the plurality of command arbiters and the plurality of command buffers, and configured to manage the contention control of the plurality of command arbiters, wherein the system arbiter is further configured to change priority of the transfer information in at least one of the plurality of command arbiters based on a status of the plurality of command buffers.

2. The information processing apparatus of claim 1, wherein the system arbiter is configured to change the priority of the transfer information in at least one of the plurality of command arbiters based on address information of transfer destination.

3. The information processing apparatus of claim 2, further comprising:

a plurality of write data control circuits, each of which is connected to a corresponding one of the plurality of command arbiters, connected to the system arbiter and configured to control data writing of a corresponding one of the plurality of transfer destination bus control units.

4. The information processing apparatus of claim 3, further comprising:
a plurality of circuits, each of which is connected to a corresponding one of the plurality of transfer originator bus control units, connected to the system arbiter and configured to perform contention control of write complete notice information for the corresponding one of the plurality of transfer originator bus control units.

5. The information processing apparatus of claim 3, further comprising:
a plurality of circuits, each of which is connected to a corresponding one of the plurality of transfer originator bus control units, connected to the system arbiter and configured to perform contention control of read data information for the corresponding one of the plurality of transfer originator bus control units.

6. The information processing apparatus of claim 1, wherein the system arbiter is configured to change the priority of the transfer information in at least one of the plurality of command arbiters based on issue information of the transfer information.

7. The information processing apparatus of claim 6, further comprising:
a plurality of write data control circuits, each of which is connected to a corresponding one of the command arbiters, connected to the system arbiter and configured to control data writing of a corresponding one of the plurality of transfer destination bus control units.

8. The information processing apparatus of claim 7, further comprising:
a plurality of circuits, each of which is connected to a corresponding one of the plurality of transfer originator bus control units, connected to the system arbiter and configured to perform contention control of write complete notice information for the corresponding one of the plurality of transfer originator bus control units.

9. The information processing apparatus of claim 7, further comprising:
a plurality of circuits, each of which is connected to a corresponding one of the plurality of transfer originator bus control units, connected to the system arbiter and configured to perform contention control of read data information provided for the corresponding one of the plurality of transfer originator bus control units.

10. The information processing apparatus of claim 6, wherein the issue information is a number of issues of the transfer information from each of the plurality of transfer originator bus control units.

11. The information processing apparatus of claim 2, wherein the address information is a number of destination addresses to which each of the plurality of transfer originator bus control units sends the transfer information.

* * * * *

UNITED STATES PATENT AND TRADEMARK OFFICE
CERTIFICATE OF CORRECTION

PATENT NO.       : 7,730,247 B2                                           Page 1 of 1
APPLICATION NO.  : 12/101474
DATED            : June 1, 2010
INVENTOR(S)      : Hiroyuki Murata It is certified that error appears in the above-identified patent and that said Letters Patent is hereby corrected as shown below:

ON THE TITLE PAGE OF THE PATENT:

Insert Item --(30) Foreign Application Priority Data

June 20, 2007   (JP)........2007-162780-- after "PRIOR PUBLICATION DATA" and prior to "(51) INT. CL."

Signed and Sealed this

Twelfth Day of October, 2010

David J. Kappos
*Director of the United States Patent and Trademark Office*